US006252588B1

(12) United States Patent
Dawson

(10) Patent No.: US 6,252,588 B1
(45) Date of Patent: *Jun. 26, 2001

(54) METHOD AND APPARATUS FOR PROVIDING AN AUDIO VISUAL E-MAIL SYSTEM

(75) Inventor: John Dawson, Palo Alto, CA (US)

(73) Assignee: Zentek Technology, Inc., Foster City, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,362

(22) Filed: Jun. 16, 1998

(51) Int. Cl.[7] .................................................. G06F 13/00
(52) U.S. Cl. ............................ 345/329; 709/206; 345/331
(58) Field of Search ..................................... 345/339, 440, 345/302, 331, 329, 330, 332; 707/10; 709/206, 245, 204, 237, 200

(56) References Cited

U.S. PATENT DOCUMENTS

| 5,564,018 | * | 10/1996 | Flores et al. ........................ 709/206 |
| 5,579,472 | * | 11/1996 | Keyworth, II et al. ............. 345/326 |
| 5,742,769 | * | 4/1998 | Lee et al. ............................ 709/206 |
| 5,752,059 | * | 5/1998 | Holleran ............................. 709/245 |
| 5,778,054 | * | 7/1998 | Kimura et al. ..................... 379/93.23 |
| 5,793,365 | * | 8/1998 | Tang et al. ......................... 345/329 |
| 5,818,935 | * | 10/1998 | Maa .................................... 380/20 |
| 5,867,281 | * | 2/1999 | Nozoe et al. ....................... 358/402 |
| 5,867,654 | * | 2/1999 | Ludwig et al. ..................... 709/204 |
| 6,014,689 | * | 1/2000 | Budge et al. ....................... 709/206 |

* cited by examiner

Primary Examiner—Raymond J. Bayerl
Assistant Examiner—Tadesse Hailu
(74) Attorney, Agent, or Firm—The Hecker Law Group

(57) ABSTRACT

An audio visual e-mail system and method are presented. The audio visual e-mail system of the invention reduces the complexity of sending and receiving audio visual e-mail messages to a level that allows a user to send and receive audio visual e-mail with a minimum of inconvenience. The prior art paradigm of selecting e-mail addresses from a list of long and complex e-mail addresses is replaced by selecting a thumbnail image of the intended recipient. Instead of trying to guess the identity of the sender of an e-mail message, an e-mail message created according to the invention is automatically "signed" by a thumbnail image of the sender. Instead of sending long written descriptions that are prone to misunderstanding and difficult to read, the sender of an e-mail message according to the invention can send a photo of the object to be described together with a verbal, audio description. In one embodiment, a user uses a television-type remote control as a command interface to create audio visual messages containing a picture, a verbal description in the user's own words, and a thumbnail portrait of the user.

11 Claims, 12 Drawing Sheets

METHOD AND APPARATUS FOR PROVIDING AN AUDIO VISUAL E-MAIL SYSTEM

BACKGROUND OF THE INVENTION

1. Field of the Invention

This invention relates to electronic messaging systems.

2. Background Art

With the proliferation of personal computers and communications networks such as the internet, electronic mail, commonly referred to as "e-mail," has become a popular mechanism for the exchange or distribution of information among individuals, and within or between enterprises, for both private and commercial purposes. There are a number of disadvantages of current e-mail systems. One disadvantage is that a computer system is needed. Another disadvantage is that it is difficult to use if a sender wants to attach pictures or audio messages to an e-mail message. These disadvantages can be understood by reviewing the way e-mail works.

An e-mail message may be analogized to a posted letter or piece of mail. However, instead of a physical object that is itself physically transported from a sender to a recipient, an e-mail message is an electronic representation that is communicated electronically through a communications network. Examples of communications networks used for communicating e-mail messages include, but are not limited to, telecommunications networks, wide area networks (WANs), local area networks (LANs), the Internet, intranets, extranets, wireless networks, and other networks over which electronic, digital, and/or analog data may be communicated.

Prior Art E-mail Systems

E-mail messages are created, sent, received, and read using a communications program, often referred to as a "mail" or "e-mail" application program. An interface of one prior art e-mail program is illustrated in FIG. 2. The example of FIG. 2 is the interface of the mail module of Netscape Communicator, an internet browser application program. The interface is displayed in a window 200. The interface includes a row of control buttons 201–210 arranged along the top of window 200, column heading boxes 212–215 arranged below control buttons 201–210, and a display field 217 that displays a list of messages. In the example of FIG. 2, the list indicates a single message 216. The information displayed for message 216 in display area 217 includes an icon 218 indicating that message 216 is an e-mail message, text 219 indicating the subject of message 216, namely "Meeting on the 20th", text 220 indicating the source or destination of message 216, in this case "Sender" and text 221 indicating the time that message 216 was sent or received, in this case 9:20 PM.

Control buttons 201–210 are used to create, modify and manipulate messages. Button 201, "Get Msg" is used to display a message that has been selected from the list of messages displayed in display area 217 (messages can also be opened by double clicking on them). Button 202, "New Msg" is used to generate a new message form that can be completed and mailed to a recipient. "Reply" button 203 is used to generate a reply form for replying to a message that is currently in view. When activated, a message form is generated that has as its address the address of the sender of the message being viewed. Optionally, the reply message may include the entire text of the sender's message. "Forward" button 204 generates a message form that includes the sender's message, but with a blank address, so that the message may be optionally annotated and forwarded to another recipient.

Button 205, "File", is used to save a message into a file in a text or other format. Button 206, "Print", is activated to print the message on an attached printer. "Security" button 208 activates security options for a message such as, for example, encryption, or the use of a digital certificate or digital signature. Messages can be deleted using "Delete" button 209. "Stop" button 210 is used to interrupt or stop operations.

Column heading boxes 212–215 contain column headings for the information displayed in display area 217. The headings specified in column heading boxes 212–215 are "Subject", "To/From", "Date", and "Priority", respectively. Messages in the list can be sorted by subject, by sender or recipient, by ascending or descending date, by priority, or by any combination thereof.

An e-mail message form 300 generated using the example e-mail program of FIG. 2 is illustrated in FIG. 3. E-mail message form 300 includes a palette of control buttons 301–308, an address entry area 309, a subject entry area 310, and a message editing area 311. Address entry area 309 indicates the destination(s) for the message, in this case "Receiver@receiver.com". Subject entry area 308 indicates the subject of the message, here "Meeting on the 20th". The body 311 of the message is displayed in editing area 312.

"Send" button 301 is activated to initiate the transmission of the message from the sender to the recipient. "Quote" button 302 is used to insert text from another message into body 311 of message displayed in editing area 312. "Address" button 303 prompts the sender to enter an address of the recipient or to select an address from a stored address book. "Spelling" button 305 performs a spell check on the message text, and "Save" button 306 is used to save a message as a text file.

"Attach" button 304 is used to attach one or more electronic files to the e-mail message. The operation of this e-mail file attachment feature illustrates disadvantages and limitations of the prior art. Often a sender wishes to send one or more files to a recipient. One method of sending a file to a recipient is to copy the information from the file (e.g. the text from a text file) and paste that information into the body 309 of an e-mail message. If the file is large, this may not be possible, since some e-mail programs have limitations on the size of the body of an e-mail message. In other cases, the files represent non-text data, such as sound, images, or movies, for example, that cannot be easily pasted into the body of an e-mail message. In such circumstances, the file attachment feature is used.

When "Attach" button 304 is activated, a dialogue box appears that allows the send er to navigate through a file system and select files to be attached to the e-mail message. After one or more files are selected, the sender causes the e-mail program to transmit the e-mail message and attached file(s) to a recipient. When the recipient reads the message, the reader's e-mail program displays an indicator indicating that one or more files are attached. If the recipient uses the e-mail program of FIGS. 2 and 3 the recipient may retrieve the attached file(s) by activating the "Attach" button. Upon activating the "Attach" button, the recipient is presented with a dialogue box that enables the recipient to retrieve the attached file or files and store them in the recipient's file system.

Attaching Image Files to E-mail Messages

Users often desire to send one or more pictures with an e-mail message. These pictures can be photographs, digital photographs, computer drawings, graphic images, or any other type of image. These kinds of image files often require preparatory work to make them suitable for attachment to e-mail messages. Accordingly, attaching image files to an e-mail message can be a complex process.

Before an image file can be attached to an e-mail message, the file must be present on the computer, or must be placed on the computer. If the file is already located on the computer the user must remember what the file is named, and where it is located. Often it is necessary not only locate the file but also to view it first to make sure that it is indeed the correct file that is intended to be sent. The file must be in a format that the person receiving the file has a capability to use. If it is not the file may have to be converted, using a conversion program, to a common format (such as GIF or JPEG) that the person receiving the file has the capability of viewing.

If the file is not already on the computer it must be taken from another source and placed on the computer. There are a variety of sources for such files. For example, the image file may come from a picture taken by a digital camera, from files on the internet, or from a CD ROM.

If the image is not already in a computer readable form, (for example, if the image is a photographic print or a newspaper clipping) it must first be converted into such a form. This can be done, for example, by using a process called scanning. When an image from a photograph or newspaper article is scanned it is placed on a device called a scanner which is attached to a computer. A scanner illuminates consecutive small sections of the item to be scanned and converts the small section into a series of numbers that represent the colors and intensity at discrete points of the section. The computer stores these numbers in a file, and then the scanner moves on to the next small section of the item to be scanned and the process is repeated over and over until the entire item has been scanned and converted into a sets of numbers and placed in the computer file. The file can then be used to recreate an image of the item scanned on another computer. However, because raw scanned files are often large and therefore difficult to transmit, they are often converted into more compact files (such as GIF or JPEG) which are smaller and therefore more easily transmitted. Scanned files are typically converted using conversion programs, and then stored in their smaller converted form on the hard disk of the computer.

Once a file exists in an appropriate format on the computer it can be sent in the form of an e-mail attachment. To attach an image file to an e-mail message a user utilizes the attachment feature of the user's e-mail program, for example, by clicking the "Attach" button 304 of the e-mail program of FIG. 3. Typically, a dialog box appears with a representation of the file system hierarchy of the computer. The user then navigates through the file system hierarchy to find the desired image file. (The user may need to first locate and view the file to verify that it is the correct file.) The user then attaches the file, usually by double clicking the mouse button on the name of the file. At that point the file has been attached to the e-mail and is ready to be sent. The user then activates the "send" command of the user's e-mail program (e.g. by clicking on the "send" button 301 of FIG. 3), and the e-mail along with the attachment is transmitted.

FIG. 4 illustrates a flow diagram of the process of inputting and attaching an image file to an e-mail as an e-mail attachment using an e-mail program of the prior art. Referring to FIG. 4, at step 401 the image resource file to be sent as an e-mail attachment is selected. At step 403 a determination is made as to whether the selected image file is present in the computer. If the image file to be sent as an attachment is already present on the computer, the process proceeds to step 405 where the image to be sent is located. After the image is located the process proceeds to decision block 407 at which a determination is made as to whether the image is in the correct format. If it is determined at decision block 407 that the image file is in the correct format, the process proceeds to step 411. If the image is not in the correct format, the process proceeds to step 409 where the image is converted to the correct format. The process then proceeds to step 411.

At step 411 the image file in the correct format is attached to the e-mail message. The sequence then proceeds to step 413, where the message containing the attached image file is transmitted to the recipient.

If it is determined at decision block 403 that the image file to be sent as an attachment is not already present on the computer, the process proceeds to decision block 415. At decision block 415 a determination is made as to whether the image is in a computer readable file format. If the image is in a computer readable file format (e.g., on a CD-ROM or retrievable from the internet), the process proceeds to step 417, where the image is retrieved from the appropriate source. The process then proceeds to decision block 407.

If it is determined at decision block 415 that the image is not in a computer readable form, the process proceeds to step 419. At step 419, the image is converted to computer readable form, for example by scanning in the image with a scanner. The process then proceeds to step 421 where the scanned image is converted into a usable format suitable for the recipient who will receive the file as an attachment. The process then proceeds to step 423. At step 423 the scanned and converted image is stored as a file on the hard disk. The process then proceeds to step 411.

Attaching a Sound File to an E-mail Message

Attaching a sound file to an e-mail message is as complex as attaching an image file. Before a sound file can be attached to an e-mail message the sound file must be present on the computer, or must be placed on the computer. If the file is already located on the computer the user must remember what the file is named, and where it is located. Often it is necessary not only locate the file but also to listen to it first to make sure that it is indeed the correct file that is intended to be sent. The file must be in a format that the person receiving the file has a capability to use. If it is not the file may have to be converted, using a conversion program, to a common format (such as WAV) that the person receiving the file has the capability of playing.

If the sound is not already in a computer readable file format, (for example if it is a spoken message, or is analog data contained on an audio tape) it must first be converted to a computer readable form. This can be done, for example, by using a microphone and a sound card installed in the computer for this purpose. To input a sound message into the computer the user will typically activate a sound recording program. The user will then activate a "record" function within the sound recording program. When the recording function has been activated the user speaks the message, plays the audio tape containing the message or otherwise creates the sound that is to be recorded. When the message is completed the user activates the "stop recording" function of the sound recording program. The microphone and sound card combination convert the sound that is entering the microphone while the recording function is active into a digital format that can be stored on the computer. One process for doing so is known as "sampling".

The process of sampling can be reversed and the sampled digital sound data converted back into sound by recreating the intensity and frequency of the sound represented by the stored digital data. To do so a playback program is typically used. The playback program takes the digital sound file that the computer has stored and converts it back to the original sound through the use of a sound card, amplifier and speaker within the computer.

If the sampling process is not rapid enough (e.g. if it does not meet the well known "Nyquist" criteria), the quality of the sound reproduced from the digital sound file will not be very high, and the sound will be distorted. To keep this sampling rate high (typically tens of thousands of samples per second) the computer must store tens of thousands of numbers per second to accurately reproduce a sampled sound. A file representing a few seconds of sound can therefore easily grow to be quite large.

It is because of this large file size that sound files are not usually stored as raw files, but, like large image files, are encoded to make their size smaller. A sound encoding program is used for this purpose. A sound encoding program can take advantage of the fact that sound in general and speech in particular has patterns of frequency and intensity, and use those patterns to reduce the size of the file. There are many different types of encoding used in sound, the WAV file encoding being one of the most popular.

After the sound has been recorded by the computer it usually is listened to by the user to ensure that the correct sound clip is contained within the file. Typically though the file will contain some unintended sounds at the beginning or end, or may not contain the entire sound message intended to be recorded. If the entire message is not contained within the file the normal procedure is to re-record the message. If the file contains additional sounds the file can be edited using a sound editing program. Usually a sound editing program is included as part of a recording program.

A sound editing program usually generates a visual representation of the sound in the form of a linear waveform graph. Several seconds of sound can typically be displayed on the screen at a time. When the sound file is played using the sound editing program, the waveform is highlighted to show the part of the waveform that is currently being heard. The user of the program can then select and delete the undesired portions of the sound file. In that way a user can, for example, eliminate a preliminary clearing of a throat prior to the speech intended to be recorded, or perhaps the beginning of a next sentence that was accidentally recorded.

After the file has been properly edited it can be stored on the computer's hard disk under a suitable name. It can also be converted, if necessary to a common format such as WAV that the intended recipient of the file has the capability of playing.

Once the file exists in an appropriate format on the computer it is ready to be sent as an e-mail attachment.

The flow process of inputting and attaching a sound file to an e-mail message is similar to the process of attaching an image file to an e-mail message, described above with reference to FIG. 4. The user must locate the file or import the file to be attached, playback the file to ensure it contains the intended sound clip, put it in the correct format, and then attach it to an e-mail message.

Receiving and Decoding E-mail Attachments

When a user receives an e-mail message that includes audio and/or image attachments, a complex series of operations must be performed before the recipient can access the attached files. First, the recipient must determine whether the recipient has received an e-mail message containing image or sound file attachments. The recipient looks for new messages using a mail checking function of the user's e-mail program, for example by clicking on the "Get Msg" button 201 of the e-mail program of FIG. 2. Identifying information for any new message that has been received is added to the message window on the recipient's display. For example in FIG. 2, the identifying information "Meeting on the 20th" for message 216 appears in the message window. (If the message is unread it sometimes will appear in boldface type).

To find out if the e-mail message contains an attachment the user must open the e-mail message. For example, the e-mail may be opened by clicking twice on the subject of the message. The message will then open up in a window as shown, for example, in FIG. 3. If there is an attachment an attachment indicator is typically displayed, such as, for example, an icon at the end of the message.

Once the user has determined that there is an attachment to the e-mail message, the user must retrieve and save the attachment. To save an attachment the attachment must first be selected. This may be done, for example, by clicking on the attachment icon. The user must then specify where the attachment is to be saved. Typically, after the attachment has been selected, a dialog box appears that allows the user to navigate through the file system and select where the attached message will be saved. The same dialog box will usually also allow the user to change the name of the attached file if desired.

After the attached file has been saved, the user may close or delete the e-mail message. To view or listen to the attached file, the user must first navigate through the file hierarchy to find the correct file and determine whether it is in a format compatible with the user's computer system. If the file is not in a format that is compatible with the programs that are present in the user's computer, the user may need to convert the file using a conversion program and then save the converted file. If the file is not in a usable format, and if the proper conversion software to convert it to the correct format is not available, the user may either obtain the necessary software, or simply discard the file as useless.

Once the file is in the proper format the user then may access (view or listen to) the file. To access the file the user must choose an appropriate accessing program and activate it. Once the accessing program has been activated the user must again navigate through the file system hierarchy to retrieve the desired file.

Because separate programs are typically required to read an e-mail message and to access attached files it is difficult to read a message and access an attached file at the same time. To do so both the e-mail program and the access program must be displayed on the user's computer monitor at the same time. Even if both programs are displayed at the same time usually only one can be active. However, to read different parts of the e-mail message the e-mail program must be the active program, while to move, adjust, or re-size an image, or to listen to a sound attachment file, the image or sound accessing program must be the active program. Often the only practical solution is to print out the text of an e-mail message on a computer, and then with the print out of the message in hand access the attached file on the computer using the appropriate accessing program.

One can see that for both sound and image file attachments the process of obtaining the file, converting the file to the proper format and using an accessing program to access the file can take many steps and be quite time consuming. In addition to being quite time consuming there is no guarantee that a user will be able to decode an attached file, either because of lack of proper decoding hardware or software, or because the process can often be so complex that the user may lose interest and simply decide it is not worth the trouble.

Other Disadvantages of E-Mail

The use of e-mail requires a certain level of computer knowledge and familiarity. An e-mail program can be quite overwhelming if the user is a person who is easily intimidated by computers. It can also be confusing to computer literate individuals who have not had a great deal of e-mail experience or are presented with an e-mail program that they are not familiar with.

The addresses of e-mail messages also can be quite confusing. Instead of having an easily understood form such as "Aunt Matilda from Seattle" e-mail addresses often take arbitrary and confusing forms such as "1654256@compuserve.com". Because received e-mail messages are usually identified by the e-mail address of the sender, an e-mail recipient will often have to actually open a message to determine who it is from. Even if the e-mail user successfully opens the mail message, the user may be confronted with a message that is contained wholly or partly in an attached file. The attached file may have a voice message within it, or a picture, or video that requires activation of a special accessing program before the entire message can be delivered.

E-mail also sometimes presents a problem in the manner that e-mail messages are displayed. For example, one user may send another user a message in a font that, while readable on the sender's machine, is difficult to read on the recipient's machine. This can be the case even if each user's e-mail program is from the same company, and the version is different. For example, an e-mail message sent by a user using a Japanese version of Microsoft Exchange may be unreadable when sent to a user using an American version of Microsoft Exchange.

SUMMARY OF THE INVENTION

The audio visual e-mail system presented here brings electronic mail within the reach of everyone, no matter what their previous experience with computers and e-mail. It allows those who have never used a computer to easily send messages to anyone with a similar system, or even to other existing systems.

The present invention brings the capabilities of e-mail to anyone who is capable of using a television remote control. The process of booting up a computer system is replaced by turning on the television. The process of activating an e-mail program, dialing up a network, logging on, and creating a message, is replaced by picking up a remote control, pressing a few remote buttons and simply speaking the intended message. There is no need to type in a message on a keyboard, the message is verbal. There is no need for entering cryptic e-mail addresses, and no lost or undelivered e-mail because a comma was inserted in the address instead of a period, or some other minor typographical error. Instead a user simply selects a picture of the intended recipient and verbally speaks the intended message.

The audio visual e-mail system of the invention is not only easier to use than prior art e-mail systems, it is also more natural and personal. Typing is not a natural method of communication. Speaking is. In the audio visual e-mail system of the invention the message is spoken, not typed. The message is delivered in the sender's words, using the sender's voice. Identifying the intended message recipient is done more naturally by selecting a thumbnail picture of the person, instead of typing an obscure e-mail address. The invention replaces the impersonal typing of addresses with visually selecting the person who is the intended recipient. Further the message is signed with a thumbnail portrait of the sender, not a typewritten "Yours Truly" making it easy to identify the sender.

The invention is much more informative and convenient than prior art e-mail systems. Instead of having to describe something with a long detailed description, a user sends a picture and speaks the intended message in the user's own words. Although pictures and sound files can be attached and sent with prior art e-mail systems, they must be sent as attachments, and are difficult to decode, and play, requiring a collection of special accessing programs.

With prior art e-mail systems there are always some messages that are deleted without being read because they are so long that reading them becomes a chore. With the audio visual e-mail system of the invention, there is no reading, or interpreting required. The recipient sees whatever the sender wants to show, and hears what the sender wants to say. All the recipient needs to do is look and listen.

The present invention doesn't require extensive computer hardware or a complex hook up to provide an audio visual e-mail system. In one embodiment, the present invention comprises a remote control, a television set, and an audio visual e-mail system box which can be integrated with the television set or attached as a separate unit. In one embodiment, the audio visual e-mail system of the invention is connected to a telecommunications network via a standard telephone jack.

One embodiment uses a remote control similar to those used for the control of a television and/or VCR. It contains a keypad for entering numbers, a set of cursor control arrow keys (up, down, left, and right) for navigating on-screen menus, and an enter key for activating menu items and selecting choices. The remote also contains keys for forward, reverse, play and stop, which may be used for playing audio visual e-mail messages.

The audio visual e-mail system box has an input for receiving remote commands from the remote control (e.g. an infrared input). The television set serves as an output and display device for the audio visual e-mail system of the invention, in addition to providing the functions of a normal television receiver.

The audio visual e-mail system box controls the sending, receiving, displaying, and managing of audio visual messages. In one embodiment audio visual messages received by the system box are converted into a video signal. The video signal is fed to the television receiver via an external input, such as an antenna input, or video and sound inputs. In the case of a built-in unit the messages are output directly to the television screen and the television sound system. In the case of a built-in unit the only external connection required is the plugging in of a telephone line connection.

The audio visual system box controls all mail functions. It dials up a telecommunications network, sends audio visual messages to the network for delivery to other e-mail systems, and controls the inputting and displaying of the visual component of the messages, as well as the playing and recording of the sound input portion of the messages.

DETAILED DESCRIPTION OF THE INVENTION

The invention is a method and apparatus for providing an audio visual e-mail system. In the following description, numerous specific details are set forth to provide a more thorough description of embodiments of the invention. It will be apparent, however, to one skilled in the art that the invention may be practiced without these specific details. In other instances, well known features have not been described in detail so as not to obscure the invention.

The audio visual e-mail system of the invention allows a user to easily send and receive audio and video e-mail messages. In one embodiment, the invention uses a television set to display a novel, easy to use user interface. Instead of trying to figure out and correctly type in a recipient's e-mail address in order to send a message as in prior art e-mail systems, the user specifies the recipient's e-mail address by selecting a thumbnail picture of the recipient. Instead of trying to figure out who sent an e-mail by looking at the e-mail address or actually having to read the e-mail, received e-mail is identified using a thumbnail picture of the sender, so the sender is immediately identifiable.

When an audio visual e-mail message is received there are no separate attachments that require the use of separate application programs to access the attachments. There are no sound file attachments which require separate application programs for listening nor separate graphic or video files that require separate application programs for viewing. The audio visual e-mail system of the invention displays any included visual file and plays any sound included in the message automatically after a thumbnail picture of the sender the message is selected. There is no need for a user to search for display programs and sound playing programs, both functions are automatically activated and operate in an integrated manner.

Figure 1:
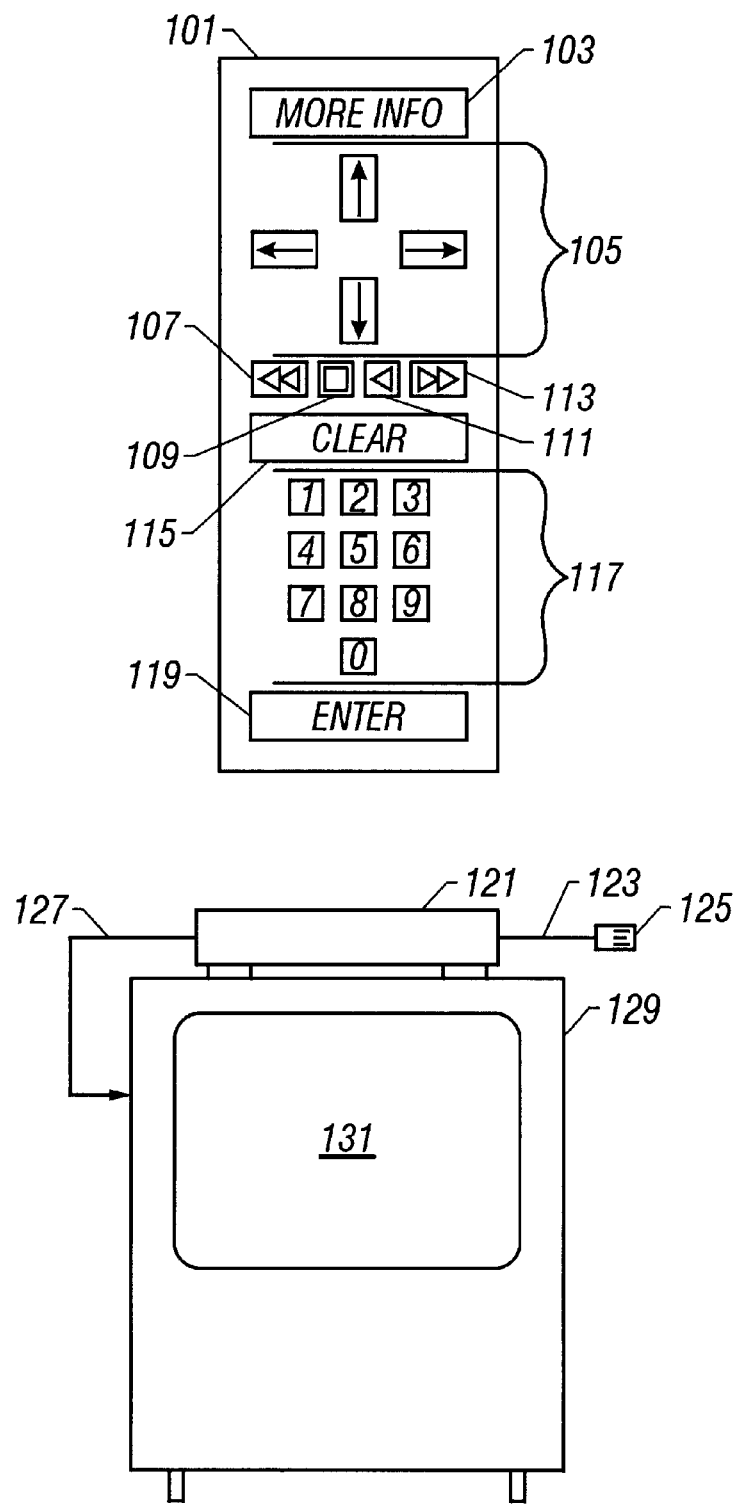
FIG. 1 illustrates components of an embodiment of an audio visual e-mail system of the invention.
Figure 2:
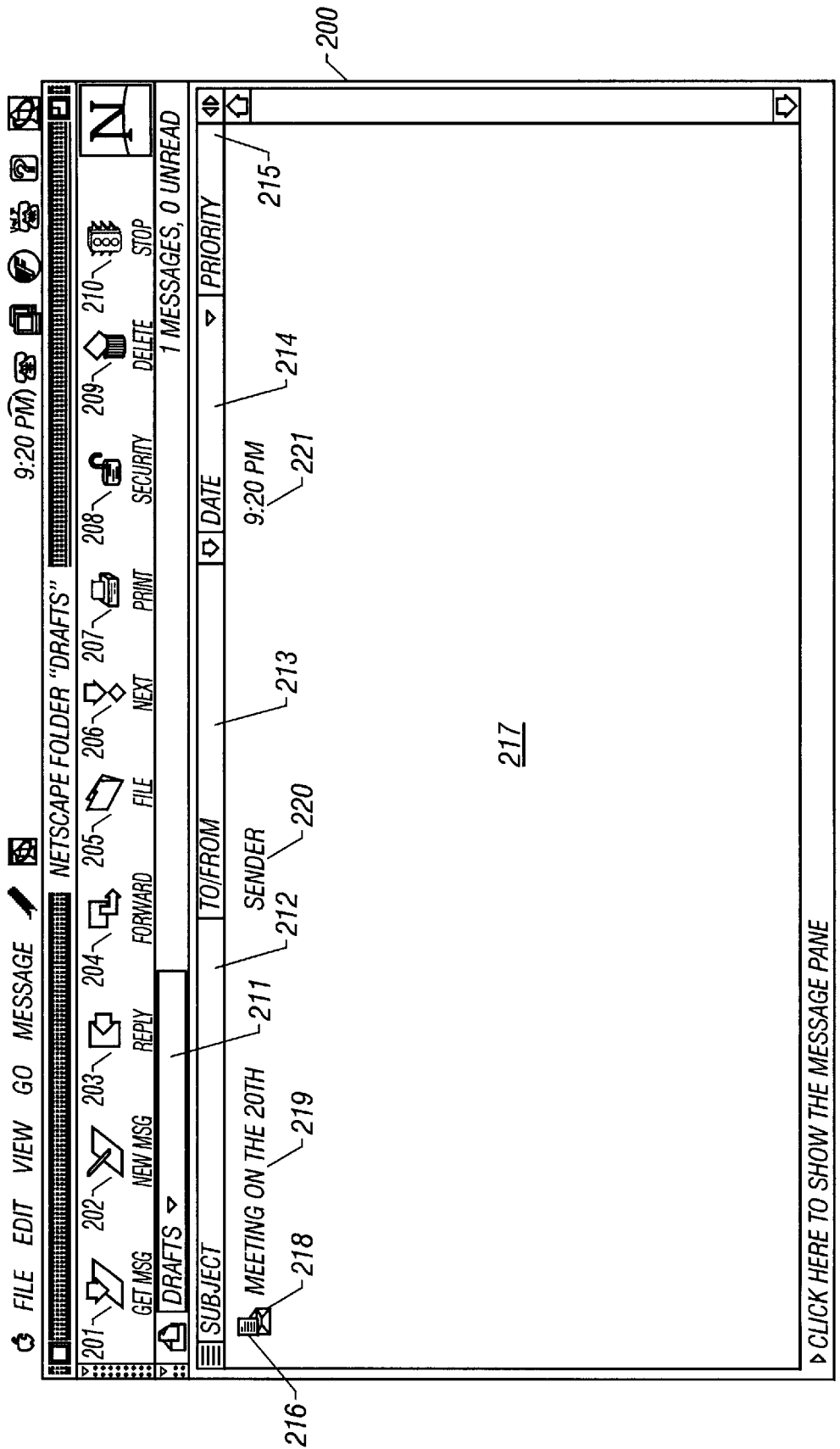
FIG. 2 illustrates a prior art e-mail program interface.
Figure 3:
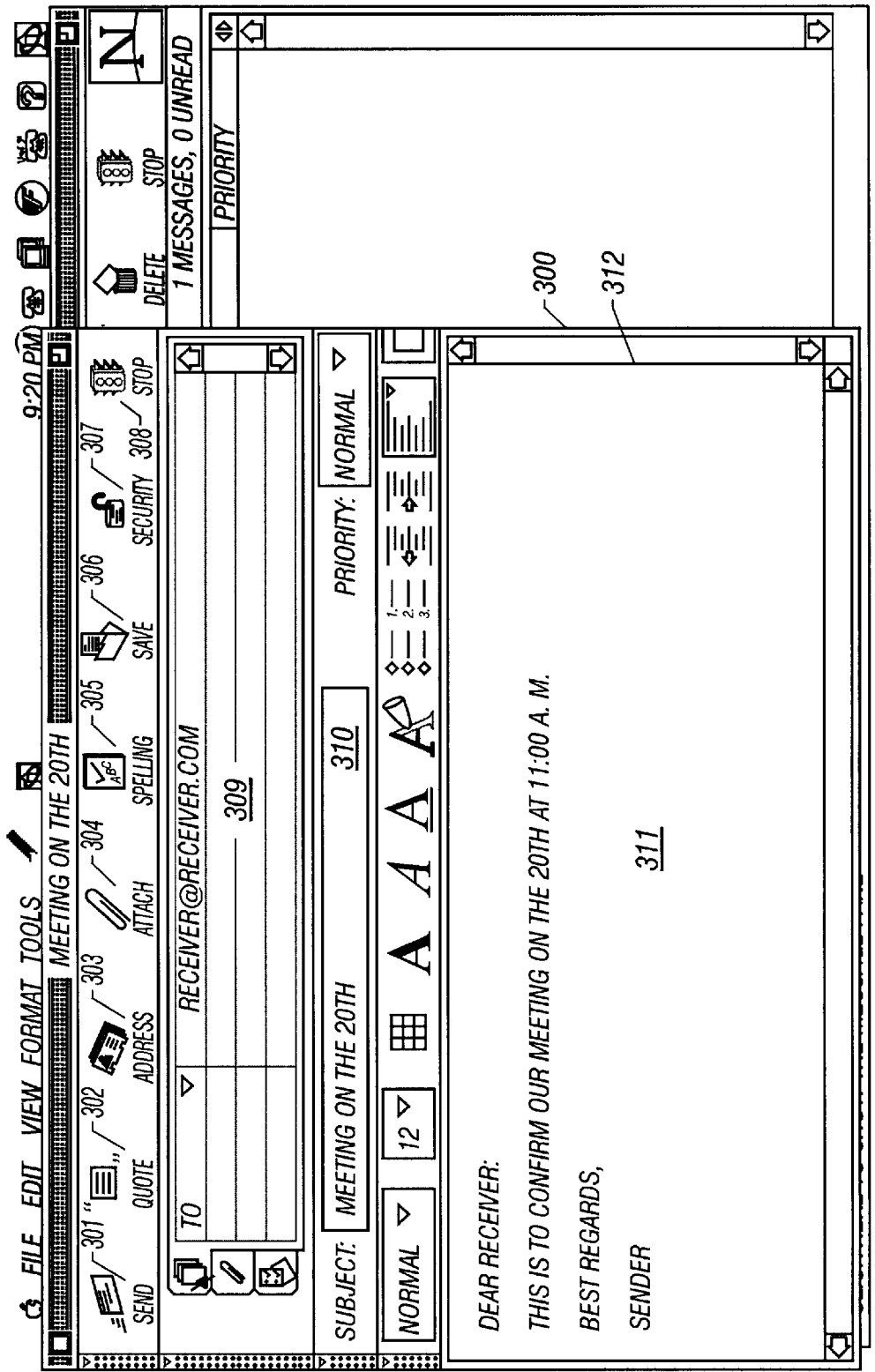
FIG. 3 illustrates a prior art e-mail message display screen.
Figure 4:
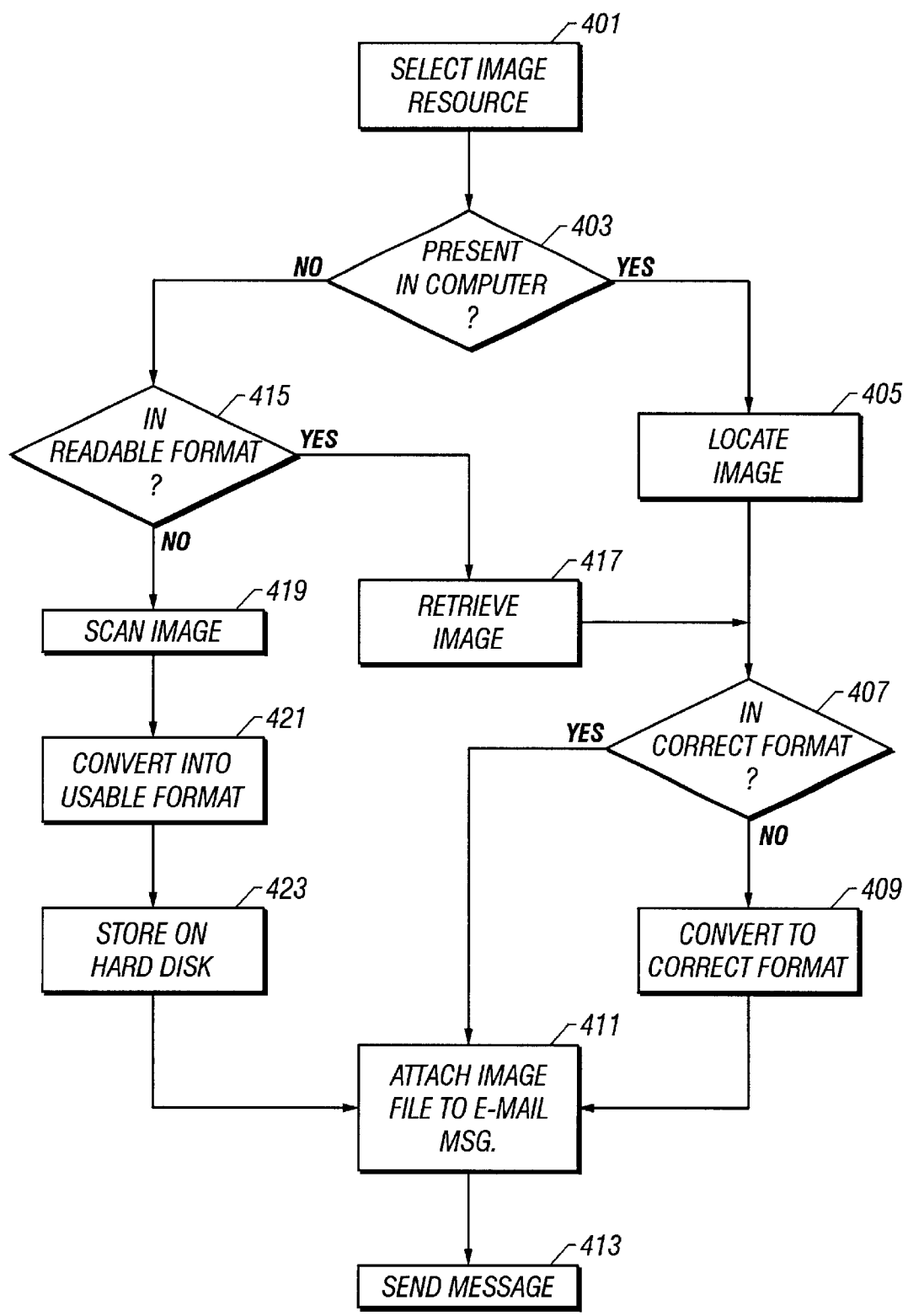
FIG. 4 is a flow diagram of a prior art process for inputting and attaching an image file to an e-mail message.

One embodiment of the audio visual e-mail system in of the invention is shown in FIG. 1. The embodiment of FIG. 1 includes a television receiver 129, an audio visual e-mail system controller 121, and a remote control 101. Remote control 101 includes several groups of keys used to operate the audio visual e-mail system. Key 103 is a "MORE INFO" key and is used to display help screens and other information to help the user operate the system. Directional keys 105 provide "UP", "DOWN", "LEFT", and "RIGHT" cursor and/or highlighting movement control. Directional keys 105 are used to select items displayed on the television-screen. The selected items may be indicated by highlighting. Keys 107, 109, 111, and 113 control the playing of messages. Key 107 is a "REWIND" key. Activating rewind key 107 moves the point in the message that is being played towards the beginning of a message. Key 109 is the "STOP" key. Activating stop key 109 stops the recording or playback of a message. Key 111 is a "FORWARD" or "PLAY" key. Activating key 111 causes a message to play or be recorded. Key 113 is a "FAST FORWARD" key. Activating fast forward key 113 moves the point in the message that is being played towards the end of the message. Key 115 is a "CLEAR" key. Activating clear key 115 causes a previous command to be cleared or clears a screen from view. The ten keys 117 comprise keypad number keys 0 through 9 and are used for entering numerical digits into the system. In certain embodiments, the keypad keys 117 also include "*" and "#".

Key 119 is an "ENTER" key. Activating enter key 119 activates functions that a user has selected from available choices displayed on the television-screen.

Audio visual e-mail system controller box 121 contains electronic circuitry for controlling the operation of the audio visual e-mail system. Controller box 121 is connected via cord 123 and phone plug 125 to a standard telephone line jack (not shown). Controller box 121 is connected to the television via cable 127.

Television 129 is used to display a user interface generated by controller 121, including messages and thumbnails representing messages that are received from senders and messages and thumbnails representing messages that are created to send to recipients. The user interface is displayed on screen 131 of television set 129.

Audio visual e-mail system controller 121 does the actual sending and receiving of messages. It also creates the messages to be sent, and displays and plays the messages received. It manages network and telephone dial-up functions necessary to accomplish the sending and receiving of messages. It also maintains a list of recipients' e-mail addresses and their associated thumbnails.

Remote control 101 is a user input device for the system. The user uses remote control 101 to command audio visual e-mail system controller 121 to create, address and send messages as well as to display, play, and discard messages. Remote control 101 is also used to command the system to print the visual portion of messages, as well as to input visual displays for use as messages and as thumbnails.

Operation of Audio Visual E-Mail System

On embodiment of the invention uses on-screen menus displayed on a television screen to operate the audio visual e-mail system. Various actions a user may take are displayed on menu screens that the user can cause to be displayed on the television screen. Each of the menu screens presents choices of one or more actions the user may take or choices of one or more menu screens that the user may cause to be activated and displayed. A user selects a choice by moving an indicator (e.g. a cursor or highlighting) up and down and back and forth across the screen using the directional keys ("UP", "DOWN", "LEFT", or "RIGHT") on the remote control. Highlighting indicates the choice that has been selected. A user activates a menu item by pressing the "ENTER" key on the remote control while the desired menu choice is highlighted.

The keys on the remote control may initiate different functions depending on the menu screen that is displayed. For instance pressing the "PLAY" key while a menu screen for playing messages is displayed will cause the audio portion of an audio visual e-mail message to play. The same "PLAY" key may have no effect when a menu screen for setup of the system is displayed, or may cause a verbal message to be recorded when a menu screen for creating a message is displayed.

The invention in one embodiment uses sub menu screens. Sub menu screens are menu screens which are activated when the choices displayed on a menu screen do not initiate any actions themselves, but instead cause other menu screens to be displayed. The sub menu screens themselves may have choices that cause further sub menu screens to be displayed. For one embodiment, all menu screens are sub menus of an INITIAL menu screen.

Organization of the Menu System

The menu system used in one embodiment of the invention is organized into a hierarchical structure of menu screens. The top level, or starting point, is called the INITIAL menu screen. From the INITIAL menu screen four second level screens are available as shown in the following diagram:

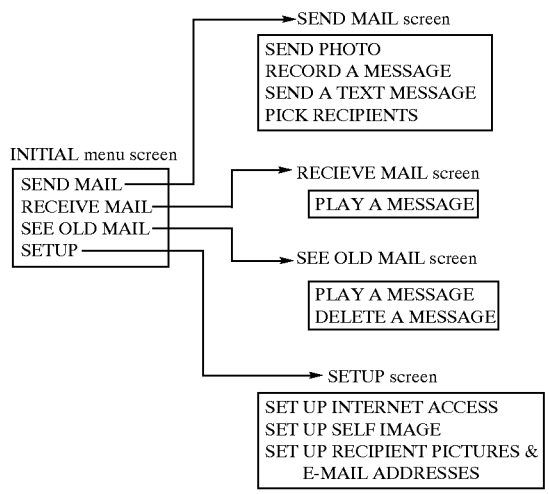

INITIAL Menu Screen

The INITIAL menu screen provides the user's entry point into the audio visual e-mail system. The INITIAL menu screen contains four menu choices as shown below:

| INITIAL |
|---|
| Send Mail |
| Receive Mail |
| See Old Mail |
| Setup |

Each of the choices on the INITIAL menu screen causes sub menu screens to be displayed. From the INITIAL menu screen a user may choose to display the SEND MAIL menu screen, the RECEIVE MAIL menu screen, the SEE OLD MAIL menu screen, or the SETUP menu screen.

In one embodiment, all menu screen selections may be controlled by keys on a remote control, for example control 101 of FIG. 1. Alternatively, another input device such as, for example, a mouse, a keyboard, or a touch-sensitive screen overlay may be used to make menu screen selections.

In an embodiment in which remote control 101 is used as an input device, the keys on the remote control 101 have the following functions when the INITIAL menu screen is displayed:

| INITIAL menu screen remote control key functions | |
|---|---|
| Key(s) | Behavior |
| MOREINFO | Displays a help screen for the currently highlighted menu choice. |
| UP, LEFT | Highlights the previous menu choice (wraps to last menu choice) |
| DOWN, RIGHT | Highlights the next menu choice (wraps to first menu choice) |
| STOP, CLEAR | Quits AV E-mail system |
| REWIND, FORWARD | No effect |
| FAST FORWARD | No effect |
| 0, 1, 2, 3, 4, 5, 6, 7, 8, 9 | No effect |
| ENTER | Causes menu screen for highlighted screen menu choice to be displayed |

The first choice on the INITIAL menu screen is "SEND MAIL". Activating the SEND MAIL choice causes the SEND MAIL menu screen to be displayed.

The SEND MAIL Menu Screen

The SEND MAIL menu screen contains four menu choices as shown below.

| SEND MAIL |
|---|
| Send Photo |
| Record a Message |
| Send a Text Message |
| Pick Recipients |

The SEND MAIL menu screen provides menu choices for selecting and sending a photo, recording a message to send, sending a text message, or picking recipients for e-mail messages.

When the SEND MAIL menu screen is displayed in an embodiment using remote control 101 as an input device, the keys on remote control 101 have the following functions:

| SEND MAIL menu screen remote control key functions | |
|---|---|
| Key | Behavior |
| MOREINFO | Displays a help screen for the currently highlighted menu choice. |
| UP, LEFT | Highlights the previous menu choice (wraps to last menu choice) |
| DOWN, RIGHT | Highlights the next menu choice (wraps to first menu choice) |
| STOP, CLEAR | Returns to INITIAL menu screen |
| REWIND, FORWARD | No effect |
| FAST FORWARD | No effect |
| 0, 1, 2, 3, 4, 5, 6, 7, 8, 9 | No effect |
| ENTER | Activates the highlighted menu choice. |

The SEND PHOTO Menu Screen

Activating the "SEND PHOTO" menu choice on the SEND MAIL menu screen causes the SEND PHOTO menu screen to be displayed.

Figure 5:
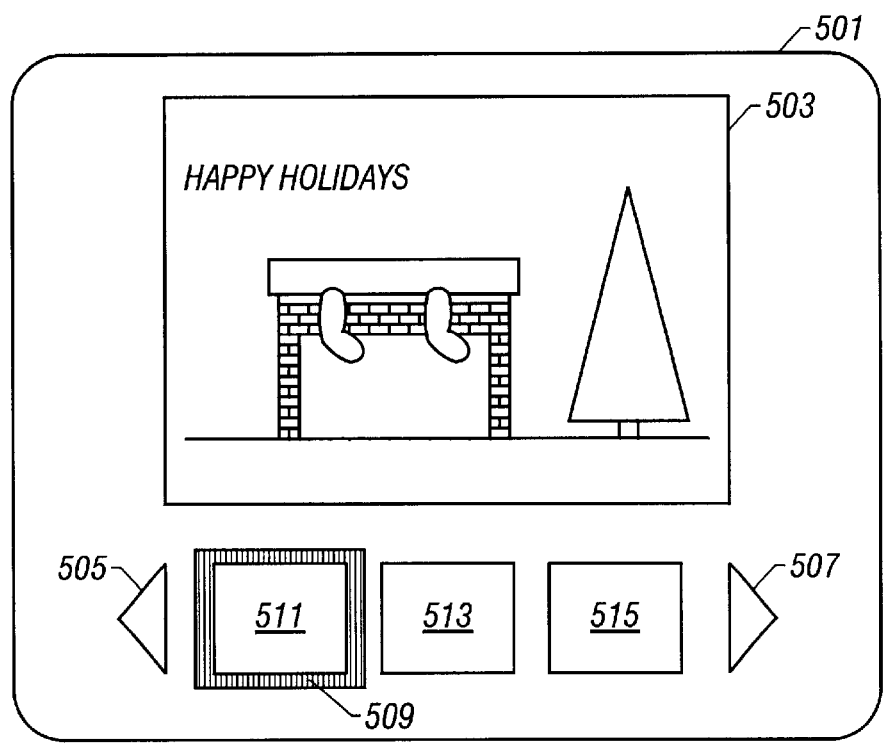
FIG. 5 illustrates a SEND PHOTO screen of an embodiment of the invention.

The SEND PHOTO menu screen 501 of one embodiment of the invention is shown in FIG. 5. Screen 501 is used to select a photo to send with an audio visual e-mail message. Photos that are available to be sent are displayed in miniature "thumbnail" form in a linear fashion at the bottom of the display. These available photos are photos that have been previously input into the system, for example from a digital camera. A user can scroll through the available thumbnails, for example using a remote control. The currently highlighted thumbnail appears full size in display area 503. After the desired photo is selected, the user is given the opportunity to record a verbal message to accompany the photo.

In FIG. 5, thumbnails 511, 513, and 515 are arranged across the bottom of the display. Any one of the thumbnails may be highlighted. In FIG. 5 thumbnail 511 has been highlighted as indicated by highlighting 509. The highlighted thumbnail appears in full size on display area 503 of the screen 501. A scrolling mechanism allows a user to scroll through available thumbnails when the number of available photographs exceeds the number of thumbnails that can be displayed on the screen. In one embodiment scrolling may be activated using directional keys 105 on remote control 101. To assist the user in the thumbnail selection process left and right scroll prompts 505 and 507 are displayed. If more thumbnails can be displayed by scrolling to the left, left scroll prompt 505 is displayed on the screen. If more thumbnails can be displayed by scrolling to the right, right scroll prompt 507 is displayed on the screen. When the user has selected the photo that the user wants to send as part of an e-mail message, the user issues an "enter" command, for example by pressing the ENTER key 119 of remote control 101, causing the currently highlighted photograph to be selected as part of the message to be sent. In addition, issuing the "enter" command initiates an audio recording process and causes the RECORD A MESSAGE screen (discussed below) to be displayed. In this way photographs to be sent are selected and recording of the audio message to be sent are begun in one embodiment of the invention.

When the SEND PHOTO menu screen is displayed in an embodiment using remote control 101 as an input device, the keys on remote control 101 have the following functions:

| SEND PHOTO menu screen remote control key functions | |
|---|---|
| Key | Behavior |
| UP, DOWN, LEFT, RIGHT | Changes the highlighted image |
| STOP | Returns to the SEND MAIL menu screen |
| ENTER | Starts recording and causes RECORD A MESSAGE screen to be displayed |
| All Other Keys | No Effect |

RECORD A MESSAGE Menu Screen

Activating the "Record a Message" menu choice on the SEND MAIL menu screen causes the RECORD A MESSAGE screen to be displayed. This screen may also be entered automatically after a photo has been selected using the SEND PHOTO menu screen. This screen is displayed while the audio portion of an audio visual e-mail message is being recorded.

Figure 6:
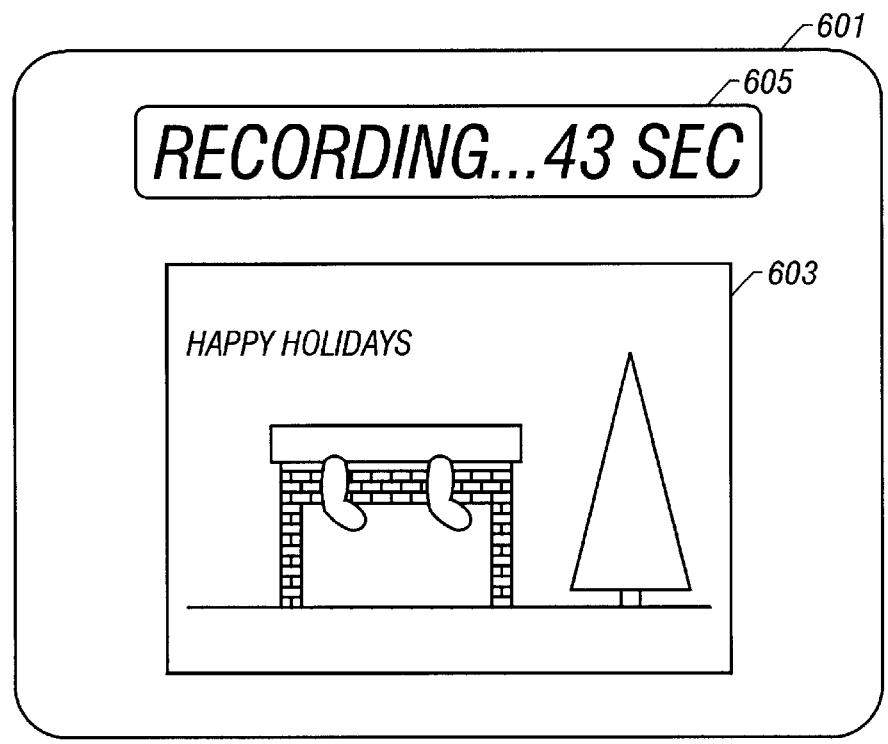
FIG. 6 illustrates a RECORDING A MESSAGE screen of an embodiment of the invention.

The RECORD A MESSAGE screen 601 of one embodiment of the invention is shown in FIG. 6. As shown in FIG. 6, the photograph that has been selected to be sent as part of the e-mail message is displayed full size in display area 603 of screen 601. The recording of an audio portion of an audio visual e-mail message begins when the RECORD A MESSAGE screen is displayed and ends when the user issues an appropriate stop command, for example by pressing STOP key 109 on remote control 101. In one embodiment, when the user issues a stop command a PICK RECIPIENTS screen (discussed below) is displayed. The recording made can be played by issuing an appropriate user command, for example by pressing the play key 111 on remote control 101, or the recording process can be restarted by issuing an appropriate user command, for example by pressing the REWIND key 107 on remote control 101. While recording is taking place a prompt 605 keeps a running tabulation of the length of the recording.

When the RECORD A MESSAGE menu screen is displayed in an embodiment using remote control 101 as an input device, the keys on remote control 101 have the following functions:

| RECORDING A MESSAGE menu screen remote control key functions | |
|---|---|
| Key | Behavior |
| REWIND | Restarts the Recording |
| STOP | Stops recording, and causes the PICK RECIPIENTS screen to be displayed. |
| PLAY | Plays recording, and then causes the PICK RECIPIENTS screen to be displayed. |
| All other keys | No effect |

The functions provided by the RECORD A MESSAGE screen allow messages to be recorded, played and re-recorded if desired.

The SEND A TEXT MESSAGE Menu Screen

Activating the "Send a Text Message" menu choice of the SEND MAIL menu screen causes the SEND A TEXT MESSAGE menu screen to be displayed. The SEND A TEXT MESSAGE screen may be used, for example, if there is no photograph to be sent, or if the user wishes to send a conventional text-only e-mail message.

Figure 7:
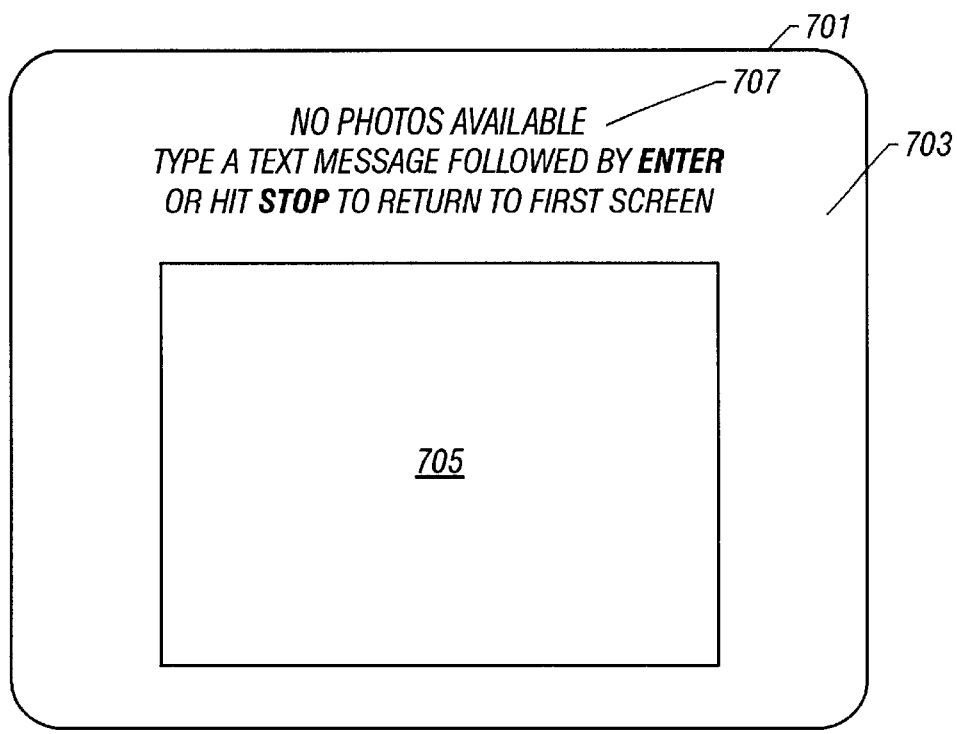
FIG. 7 illustrates a SENDING A TEXT MESSAGE screen of an embodiment of the invention.

SEND A TEXT MESSAGE menu screen 701 of one embodiment of the invention is shown in FIG. 7. SEND A TEXT MESSAGE menu screen 701 includes a text entry area 705 and an instruction 707. Text entered by a user using an input device (such as, for example, an attached keyboard, a virtual on-screen keyboard, a remote control comprising text characters, etc.) is displayed in text entry area 705. Instruction 707 informs the user that no photo is available and instructs the user to type a text message followed by ENTER or to hit STOP to return to the INITIAL menu screen.

When the SEND A TEXT MESSAGE menu screen is displayed in an embodiment that uses remote control 101 as an input device, the keys on remote control 101 have the following functions:

| SENDING A TEXT MESSAGE menu screen remote control key functions | |
|---|---|
| Key | Behavior |
| ENTER | Causes the PICK RECIPIENTS screen to be displayed |
| STOP | Returns to the INITIAL menu screen |
| All other keys | No effect |

The PICK RECIPIENTS Menu Screen

Activating the "Pick Recipients" menu choice of the SEND MAIL menu screen or completing a recording or a text message causes the PICK RECIPIENTS menu screen to be displayed. The PICK RECIPIENTS menu screen provides the user the ability to visually select intended e-mail message recipients.

Figure 8:
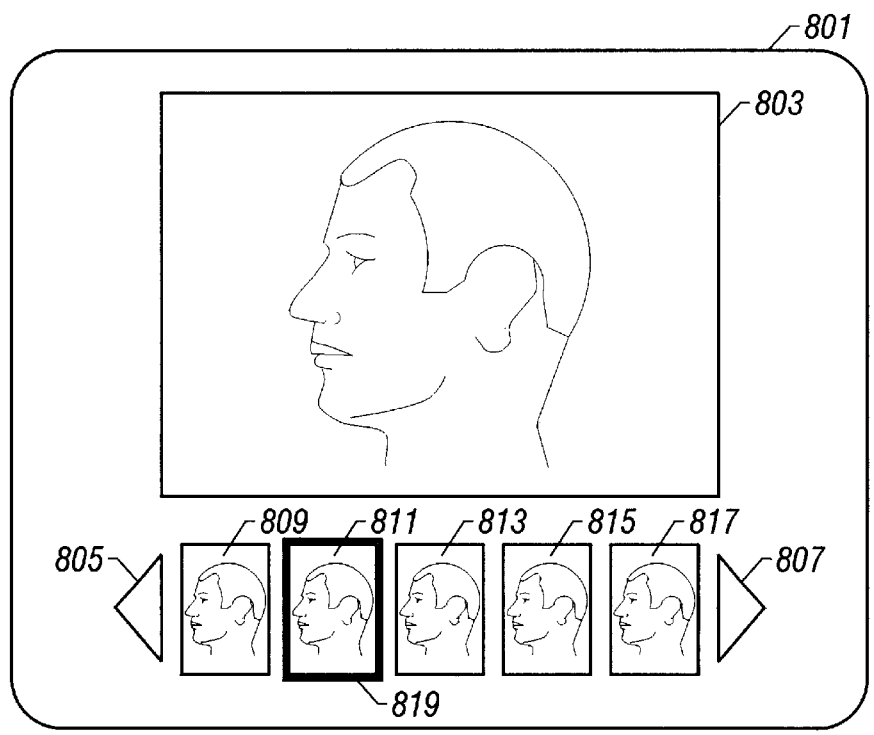
FIG. 8 illustrates a PICKING RECIPIENTS screen of an embodiment of the invention.

PICK RECIPIENTS screen 801 of one embodiment of the invention is shown in FIG. 8. As shown in FIG. 8 a row of thumbnail pictures 809, 811, 813, 815, and 817 is displayed along the lower half of the screen 801. In the embodiment of FIG. 8, thumbnail 811 is the currently selected thumbnail, as indicated by highlighting 819. The photograph represented by thumbnail 811 is displayed full size in display area 803 of screen 801. In one embodiment, an intended recipient is selected by moving highlighting 819 to the right and left through the use of UP, DOWN, LEFT, and RIGHT directional keys 105 on remote control 101.

To assist the user in the thumbnail selection process left and right scroll prompts 805 and 807 may be displayed. If more thumbnails can be displayed by scrolling to the left, left scroll prompt 805 is displayed on screen 801. If more thumbnails can be displayed by scrolling to the right, right scroll prompt 807 is displayed on screen 801. After the user finds and selects the thumbnail of the intended recipient the user may issue an "enter" command (for example, by pressing the ENTER key 119 of remote control 101) causing the recipient represented by the currently highlighted thumbnail to be selected as a recipient of the e-mail message and causing the PICK MORE RECIPIENTS screen (discussed below) to be displayed.

When the PICK RECIPIENTS menu screen is displayed in an embodiment that uses remote control 101 as an input device, the keys on the remote have the following functions:

| PICKING RECIPIENTS menu screen remote control key functions | |
|---|---|
| Key | Behavior |
| MOREINFO | Displays a help screen. |
| UP, LEFT | Selects and highlights the previous image (wraps to last image). |
| DOWN, RIGHT | Selects and highlights the next image (wraps to first image). |
| ENTER | Selects the recipient represented by the highlighted image causes the PICK MORE RECIPIENTS screen to be displayed. |
| STOP | Returns to the INITIAL menu screen. |
| All other keys | No effect |

The user can thus visually select recipients for an audio visual e-mail message simply by selecting thumbnails displayed in the PICK RECIPIENTS screen.

PICK MORE RECIPIENTS Menu Screen

Pressing the enter key when an image in the "Pick Recipients" screen is highlighted selects a recipient for the e-mail message being sent and causes a PICK MORE RECIPIENTS menu screen to be displayed. The PICK MORE RECIPIENTS menu screen allows the user to visually select additional recipients for the user's e-mail message.

Figure 9:
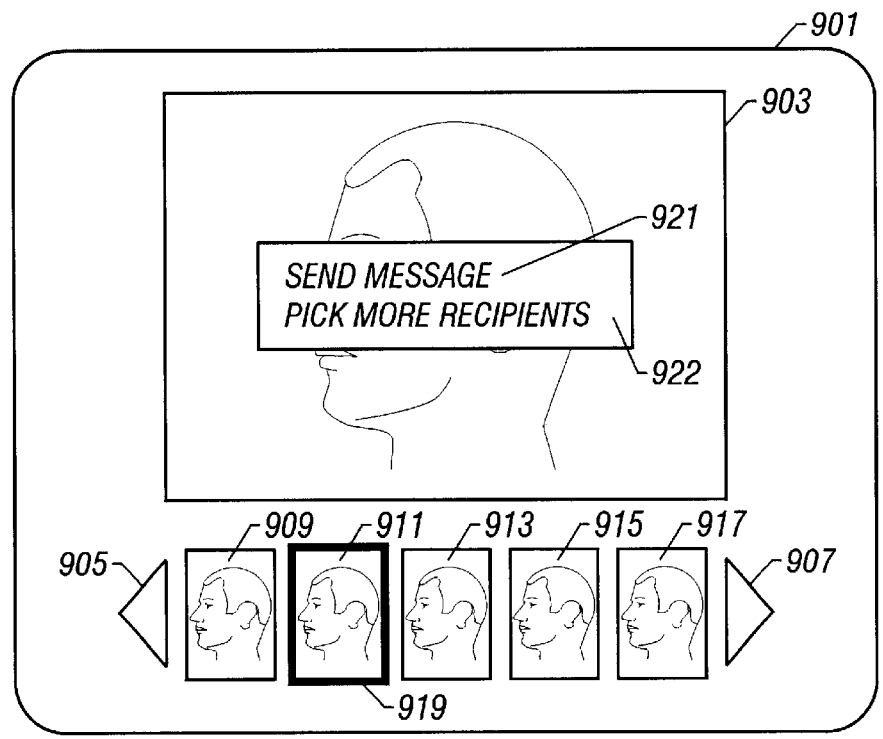
FIG. 9 illustrates a PICKING MORE RECIPIENTS screen of an embodiment of the invention.

PICK MORE RECIPIENTS screen 901 of one embodiment of the invention is shown in FIG. 9. In the embodiment of FIG. 9, a row of thumbnail pictures 909, 911, 913, 915, and 917 of possible recipients is displayed along the bottom of screen 901. In FIG. 9, thumbnail 911 is the currently selected thumbnail, as indicated by highlighting 919. The photograph represented by highlighted thumbnail 911 is displayed full size in display area 903. In one embodiment, the currently selected thumbnail can be changed by moving highlighting 819 to the right and the left through the use of UP, DOWN, LEFT, and RIGHT directional keys 105 on remote control 101.

To assist the user in the thumbnail selection process left and right scroll prompts 905 and 907 may be displayed. If more thumbnails can be displayed by scrolling to the left, left scroll prompt 905 is displayed on screen 901. If more thumbnails can be displayed by scrolling to the right, right scroll prompt 907 is displayed on the screen 901.

In one embodiment, PICK MORE RECIPIENTS screen 901 includes menu choices 921 ("Send Message") and 922 ("Pick More Recipients"). Activating menu choice 921 (for example by pressing ENTER key 119 of remote control 101 when menu choice 921 is highlighted) causes the recipient represented by the currently highlighted thumbnail to be designated an additional recipient and causes the e-mail message to be sent to all currently designated recipients. Thereafter, the INITIAL menu screen is displayed. Activating menu choice 922 (for example by pressing ENTER key 119 of remote control 101 when menu choice 922 is highlighted) causes the recipient represented by the currently highlighted thumbnail to be designated an additional recipient and leaves PICK MORE RECIPIENTS screen 901 displayed to allow the selection of additional recipients.

When the PICK MORE RECIPIENTS menu screen is displayed in an embodiment that uses remote control 101 as an input device, the keys on remote control 101 have the following functions:

| PICKING MORE RECIPIENTS menu screen remote control key functions | |
|---|---|
| Key | Behavior |
| MOREINFO | Displays a help screen. |
| UP, LEFT, DOWN, RIGHT | Changes the screen item that is highlighted. |
| ENTER | Causes currently selected recipient to be designated as an additional recipient and (1) sends the message to all designated recipient(s) and causes INITIAL menu screen to be displayed if "Send Message" menu choice is selected, or (2) leaves PICK MORE RECIPIENTS menu screen displayed if "Pick more recipients" menu choice is selected. |
| STOP | Returns to the INITIAL menu screen. |
| All other keys | No effect |

RECEIVE MAIL Menu Screen

Activating the "Receive Mail" menu choice of the INITIAL menu screen causes a RECEIVE MAIL Screen to be displayed. This screen provides functions allowing the user to play and view received audio visual e-mail messages.

Figure 10:
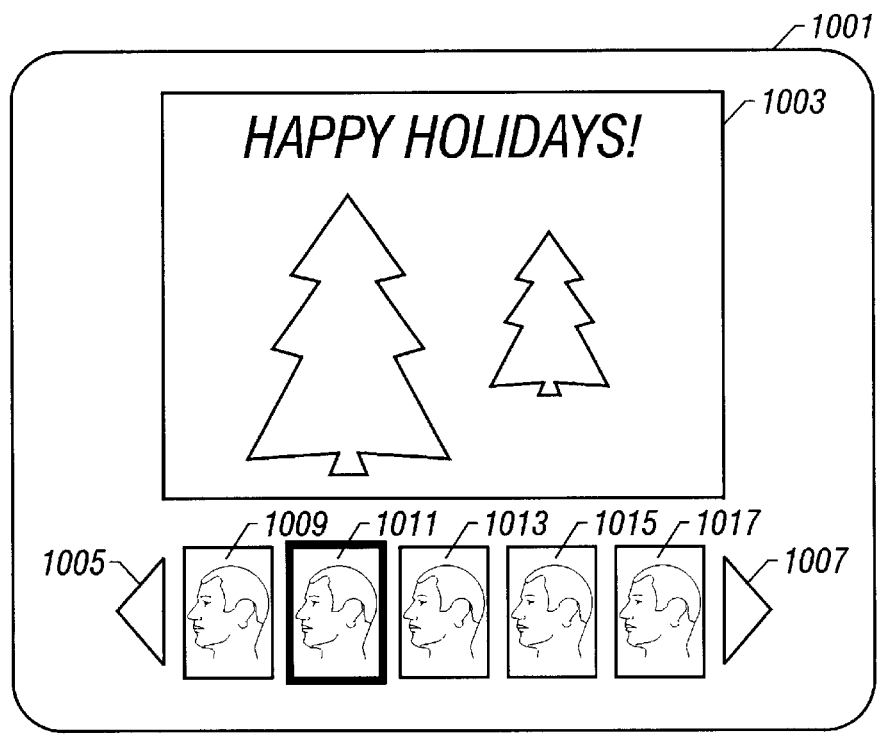
FIG. 10 illustrates a RECEIVING MAIL screen of an embodiment of the invention.

RECEIVE MAIL menu screen 1001 of one embodiment of the invention is shown in FIG. 10. In the embodiment of FIG. 10, a row of thumbnail pictures 1009, 1011, 1013, 1015, and 1017 of the senders of e-mail messages that have been received is displayed along the lower half of screen 1001. A user selects the mail message to be displayed by selecting the thumbnail of the sender whose message is to be displayed. In FIG. 10, thumbnail 1011 is the currently selected thumbnail, indicated by highlighting 1019. Accordingly, the visual message received from the sender represented by thumbnail 1011 is displayed full size in display area 1003. In one embodiment, the desired thumbnail is selected by moving highlighting 1019 to the right and the left through the use of UP, DOWN, LEFT, and RIGHT directional keys 105 on remote control 101.

To assist the user in the thumbnail selection process left and right scroll prompts 1005 and 1007 may be displayed. If more thumbnails can be displayed by scrolling to the left, left scroll prompt 1005 is displayed on screen 1001. If more thumbnails can be displayed by scrolling to the right, right scroll prompt 1007 is displayed on screen 1001. After the user has selected the thumbnail of the sender whose message the user wants to hear, the user can initiate playing of the message by issuing an "enter" command, for example by pressing the ENTER key 119 of remote control 101. In response to the "enter" command, playback of the audio portion of the selected e-mail message is begun and a PLAY A MESSAGE screen (discussed below) is displayed.

When the RECEIVE MAIL menu screen is displayed in an embodiment that uses remote control 101 as an input device, the keys on remote control 101 have the following functions:

| RECEIVE MAIL menu screen remote control key functions | |
|---|---|
| Key | Behavior |
| MOREINFO | Displays a help screen |
| UP, LEFT | Highlights the preceding thumbnail (wraps to last thumbnail) |
| DOWN, RIGHT | Highlights the next thumbnail (wraps to first thumbnail) |
| STOP | Displays INITIAL menu screen |
| ENTER | Begins playback of message and causes PLAY A MESSAGE Screen to be displayed |

The RECEIVE MAIL screen provides functions that allow a user to select and play audio visual e-mail messages. The user can scroll through a row of thumbnails which represent the messages the user has received. While the user is scrolling through the thumbnails, the upper portion of the display screen shows the visual portion of the e-mail. The user is thus able to determine both the identity of the senders and the content of the visual portions of the e-mail messages by scrolling through the thumbnail pictures of the senders. In this way the user has a good idea of the contents of an audio visual e-mail message even before its associated audio message is played.

PLAY A MESSAGE Screen

In one embodiment of the invention, issuing an "enter" command, for example by pressing ENTER key 119 on remote control 101 while a thumbnail representing a sender of a message is highlighted on the RECEIVE MAIL screen causes the audio portion of the sender's message to be played and a PLAY A MESSAGE screen to be displayed.

Figure 11:
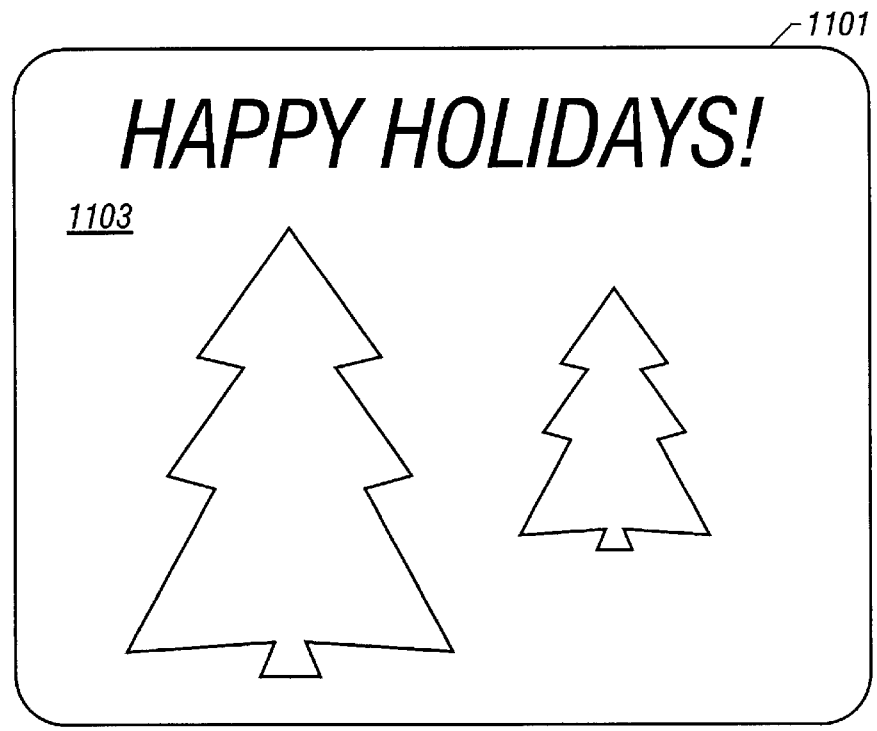
FIG. 11 illustrates a PLAY A MESSAGE screen of an embodiment of the invention.

The PLAY A MESSAGE screen 1101 of one embodiment of the invention is shown in FIG. 11. In the embodiment of FIG. 11, the visual portion 1103 of the message being played is displayed as a full screen image on screen 1101. Thus, the visual part of the message is displayed full screen while the audio portion of the message is played. While the PLAY A MESSAGE screen is displayed, the user can control playback of the message by issuing appropriate commands, for example by using remote control 101.

When the PLAY A MESSAGE menu screen is displayed in an embodiment using remote control 101 as an input device, the keys on remote control 101 have the following functions:

| PLAY A MESSAGE menu screen remote control key functions | |
|---|---|
| Key | Behavior |
| MOREINFO | Displays a help screen. |
| REWIND | Replays the message from the beginning. |
| STOP | Stops playing the message and returns to the RECEIVE MAIL screen. |
| FAST FORWARD | Fast-forwards the message two seconds per key press. |
| All Other Keys | No effect |

SEE OLD MAIL Screen

Activating the "See Old Mail" menu choice from the INITIAL menu screen causes a SEE OLD MAIL screen to be displayed. It is from this screen that old audio visual e-mail messages may be played and/or deleted.

Figure 12:
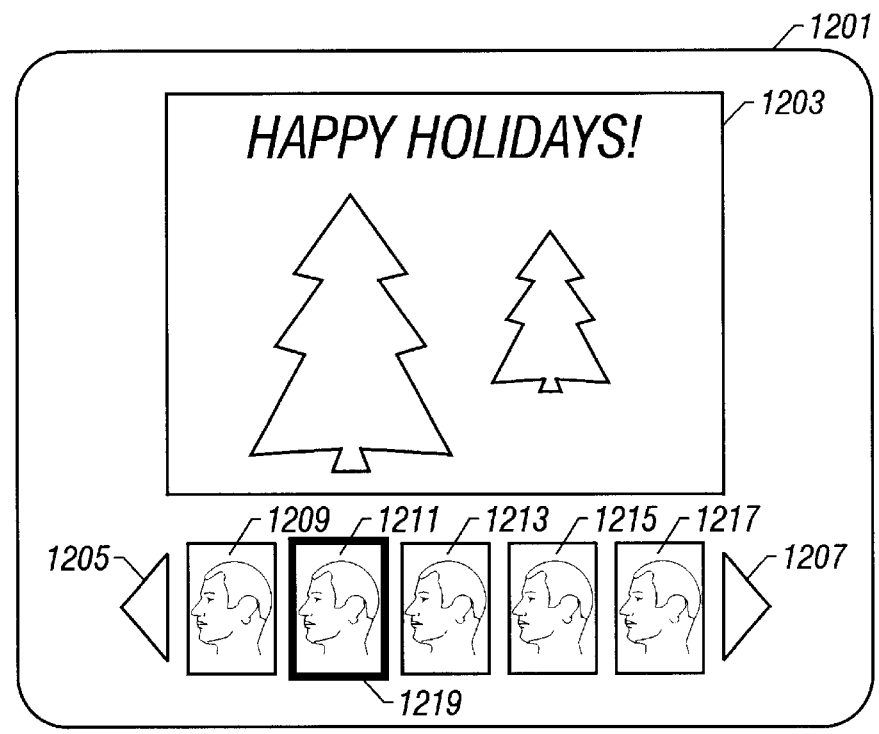
FIG. 12 illustrates a SEE OLD MAIL screen of an embodiment of the invention.

FIG. 12 shows the SEE OLD MAIL screen 1201 of one embodiment of the invention. In the embodiment of FIG. 12, a row of thumbnail pictures 1209, 1211, 1213, 1215, and 1217 of the senders of audio visual e-mail messages that have been received and saved is displayed along the bottom of screen 1201. In FIG. 12, thumbnail 1211 is the currently selected thumbnail, as indicated by highlighting 1219. The visual message associated with currently selected thumbnail 1219 is displayed full size in display area 1203. The currently selected thumbnail can be changed by issuing appropriate commands, for example by using UP, DOWN, LEFT, and RIGHT directional keys 105 of remote control 101, and the visual portion displayed in display area 1203 will change accordingly To assist the user in the thumbnail selection process left and right scroll prompts 1205 and 1207 may be displayed. If more thumbnails can be displayed by scrolling to the left, left scroll prompt 1205 is displayed on screen 1201. If more thumbnails can be displayed by scrolling to the right, right scroll prompt 1207 is displayed on screen 1201. After the user has selected the thumbnail of the sender whose message the user wants to hear, the user can initiate playback of the audio portion of the sender's message by issuing an "enter" command, for example by pressing ENTER key 119 of remote control 101. Issuing an "enter" command while a sender's thumbnail is highlighted causes the sender's message to be played and the PLAY A MESSAGE screen (described above) to be displayed.

When the SEE OLD MAIL screen is displayed in an embodiment using remote control 101 as an input device, the keys on remote control 101 have the following functions:

| SEE OLD MAIL menu screen remote control key functions | |
|---|---|
| Key | Behavior |
| MOREINFO, ENTER, PLAY, FASTFORWARD | Begins playback of message corresponding to highlighted thumbnail and causes PLAY A MESSAGE screen to be displayed. |
| UP, LEFT | Moves highlighting back one thumbnail. Wraps to the last thumbnail. |
| DOWN, RIGHT | Moves highlighting forward one thumbnail. Wraps to the first thumbnail. |

-continued

SEE OLD MAIL menu screen remote control key functions

| Key | Behavior |
| --- | --- |
| REWIND | No action. |
| STOP | Returns to the INITIAL menu screen. |
| CLEAR | Causes DELETE A MESSAGE screen to be displayed. |
| 0, 1, 2, 3, 4, 5, 6, 7, 8, 9, followed by ENTER | Any number followed by the ENTER key goes to that number thumbnail; it is equivalent to pressing the LEFT or RIGHT key the appropriate number of times to select that number thumbnail. |

DELETE A MESSAGE Screen

Pressing CLEAR key 115 on remote control 101 while the SEE OLD MAIL screen is displayed in one embodiment of the invention causes a DELETE A MESSAGE screen to be displayed.

Figure 13:
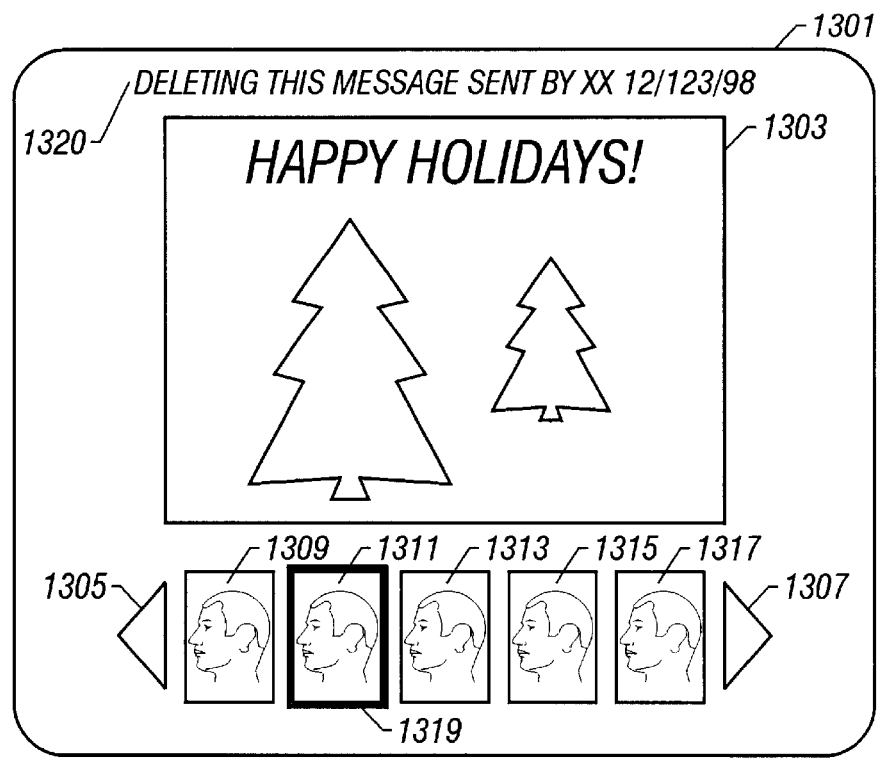
FIG. 13 illustrates a DELETING A MESSAGE screen of an embodiment of the invention.

The DELETE A MESSAGE screen 1301 of one embodiment of the invention is shown in FIG. 13. In the embodiment of FIG. 13, a row of thumbnail pictures 1309, 1311, 1313, 1315, and 1317 of the senders of audio visual e-mail messages that have been received and saved are displayed along the bottom of screen 1301. In FIG. 13, thumbnail 1311 is the currently selected thumbnail as indicated by highlighting 1319. The visual message associated with currently selected thumbnail 1311 is displayed full size in display area 1303. In one embodiment, the currently selected thumbnail can be changed by moving highlighting 1319 to the right and the left through the use of UP, DOWN, LEFT, and RIGHT directional keys 105 on remote control 101. The visual portion of the displayed message 1303 will change accordingly. The selected message can be deleted by issuing a "delete" command, for example by pressing CLEAR key 115 or ENTER key 119 of remote control 101. A "Deleting Message" prompt 1320 is displayed while the message is being deleted.

To assist the user in selecting a thumbnail left and right scroll prompts 1305 and 1307 may be displayed. If more thumbnails can be displayed by scrolling to the left, left scroll prompt 1305 is displayed on screen 1301. If more thumbnails can be displayed by scrolling to the right, right scroll prompt 1307 is displayed on screen 1301. When the thumbnail of the sender whose message is to be deleted is highlighted, issuing an appropriate delete command, for example by pressing ENTER key 119 or the CLEAR key 115 on remote control 101, causes the selected message to be deleted.

When the DELETE A MESSAGE menu screen is displayed in an embodiment that uses remote control 101 as an input device, the keys on remote control 101 have the following functions:

DELETE A MESSAGE menu screen remote control key functions

| Key | Behavior |
| --- | --- |
| MOREINFO, PLAY, FASTFORWARD | Plays the message corresponding to the highlighted thumbnail, displays the PLAY A MESSAGE screen, then returns to the DELETE A MESSAGE screen. |

-continued

DELETE A MESSAGE menu screen remote control key functions

| Key | Behavior |
| --- | --- |
| UP, LEFT | Moves highlighting back one thumbnail. Wraps to the last thumbnail. |
| DOWN, RIGHT | Moves highlighting forward one thumbnail. Wraps to the first thumbnail. |
| REWIND, 0, 1, 2, 3, 4, 5, 6, 7, 8, 9 | No action. |
| STOP | Returns to the previous screen (SEE OLD MAIL or RECEIVE MAIL screen.) |
| CLEAR, ENTER | Deletes the message corresponding to the highlighted thumbnail and returns to the previous screen. |

The functions provided by the DELETE A MESSAGE screen thus allow a user to select and delete messages.

SETUP Menu Screen

Activating the "Setup" menu choice from the INITIAL menu screen of one embodiment of the invention causes a SETUP menu screen to be displayed. In one embodiment, the SETUP menu screen provides the following menu selections:

| SETUP |
| --- |
| Set Up Internet Access |
| Set Up Self Image |
| Set Up Recipient Pictures and E-mail Addresses |

The SETUP menu screen provides functions that allow the user to set up various parts of the audio visual e-mail system.

Activating the first choice on the SETUP menu screen, "Set up Internet Access," in one embodiment of the invention causes a SET UP INTERNET ACCESS menu screen or a SIMPLE INTERNET SETUP to be displayed. The SET UP INTERNET ACCESS screen allows the user to specify the necessary parameters and passwords for the system to connect to a communications network such as the internet. The SIMPLE INTERNET SETUP screen also allows the user to specify the necessary parameters and passwords for the system to connect to a communications network, and is used in situations where many of the necessary parameters and passwords are already stored in the system as default values.

Activating the second choice on the SETUP menu screen, "Set up Self Image" causes a SET UP SELF IMAGE menu screen to be displayed. The SET UP SELF IMAGE menu screen allows the user to select a thumbnail that will be sent as identification with the user's audio visual e-mail messages. In one embodiment, this thumbnail is embedded in a header of an audio visual e-mail message. When the recipient receives the user's audio visual e-mail message, this thumbnail of the sender of the message is displayed, allowing the recipient to immediately identify the sender of the message.

Activating the third choice on the setup screen, "Set up Recipient's Pictures and E-Mail Addresses," causes the RECIPIENT PICTURES AND E-MAIL ADDRESSES screen to be displayed. The RECIPIENT PICTURES AND E-MAIL ADDRESSES screen allows the user to create a audio visual e-mail address book. The functions provided by this screen allows the user to associate thumbnails with recipient addresses. Once this association between a recipient's thumbnail and e-mail address is made, the recipient's e-mail address need not be entered again, unless the e-mail address changes. After this association is made the recipient of an e-mail message is selected by choosing the thumbnail representing the recipient rather than typing out the recipient's e-mail address.

When the SETUP menu screen is displayed in an embodiment that uses remote control 101 as an input device, the keys on remote control 101 have the following functions:

| SETUP menu screen remote control key functions | |
|---|---|
| Key | Behavior |
| MOREINFO | Displays a help screen for the currently highlighted menu selection |
| UP, LEFT | Highlights the previous menu selection (wraps to last menu selection) |
| DOWN, RIGHT | Highlights the next menu selection (wraps to first menu selection) |
| REWIND, FORWARD, FAST-FORWARD, 0, 1, 2, 3, 4, 5, 6, 7, 8, 9, | No action. |
| ENTER | Causes the menu screen for the currently highlighted menu selection to be displayed |

The SETUP menu screen allows the user to set up and change different parameters of the system. The SETUP menu screen provides access to other menu screens that allow the user to set up the parameters necessary to connect to a telecommunications network, to set up the user's thumbnail for the purpose of "signing" outgoing messages, and to create a thumbnail address book for recipients of audio visual e-mail messages.

SET UP INTERNET ACCESS Menu Screen

Activating the "Setup Internet Access" menu selection from the SETUP menu screen in one embodiment of the invention causes a SET UP INTERNET ACCESS menu screen or a SIMPLE INTERNET SETUP screen to be displayed. The SIMPLE INTERNET SETUP screen is displayed if the system has been pre-configured with default values for many of the parameters required for setting up internet access for the system. Otherwise, the SET UP INTERNET ACCESS screen menu is displayed.

Figure 14:
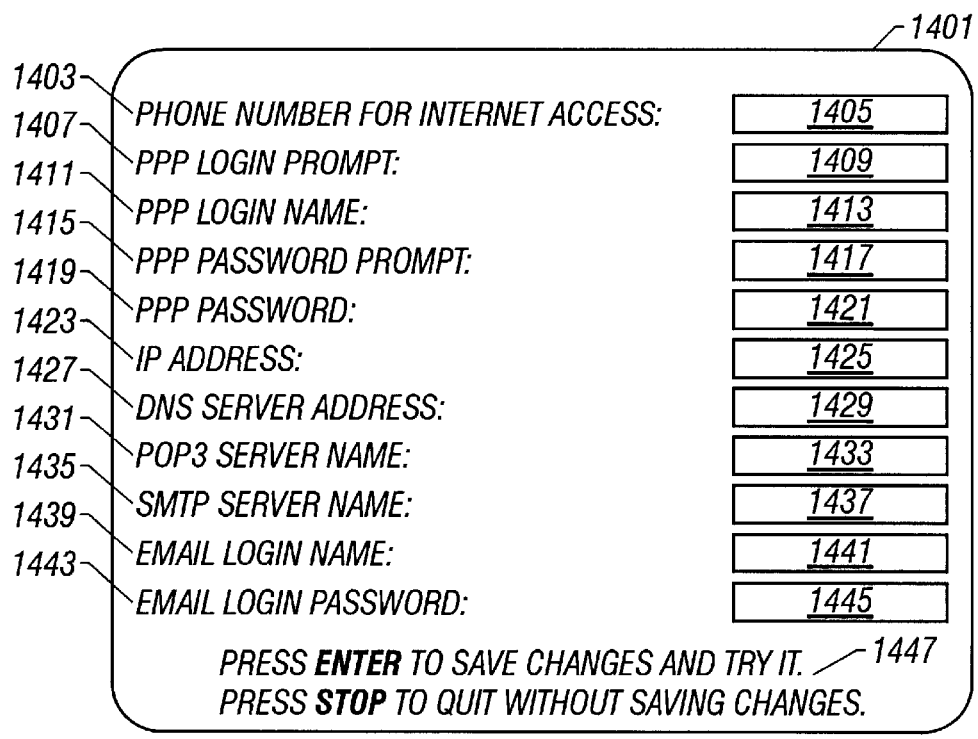
FIG. 14 illustrates a SET UP INTERNET ACCESS screen of an embodiment of the invention.

FIG. 14 shows the SET UP INTERNET ACCESS menu screen 1401 of one embodiment of the invention. In the embodiment of FIG. 14, SET UP INTERNET ACCESS menu screen 1401 contains text entry fields 1405, 1409, 1413, 1417, 1421, 1425, 1429, 1433, 1437, 1441 and 1445 for parameters 1403, 1407, 1411, 1415, 1419, 1423, 1427, 1431, 1435, 1439 and 1443, respectively. Values for the parameters are entered by the user into the respective text entry fields using an appropriate input device, such as, for example, remote control 101. The parameters entered into the text fields are summarized in the following table.

| SET UP INTERNET ACCESS Menu Screen Parameters | | |
|---|---|---|
| Parameter | Reference number of Parameter in FIG. 14 | Reference number of associated text entry field in FIG. 14 |
| Phone number for internet access. | 1403 | 1405 |
| FPP login prompt | 1407 | 1409 |
| FFF login name | 1411 | 1413 |
| FPP password prompt | 1415 | 1417 |
| PPP password | 1419 | 1421 |
| IP address | 1423 | 1425 |
| DNS server address | 1427 | 1429 |
| POP3 server name | 1431 | 1433 |
| SMTP server name | 1435 | 1437 |
| e-mail login name | 1439 | 1441 |
| e-mail login password | 1443 | 1445 |

In FIG. 14, the bottom portion of the menu screen includes user instructions 1447, which instruct the user to "Press ENTER to save changes and try it" or to "Press STOP to quit without saving changes".

When the SETUP INTERNET ACCESS menu screen is displayed in an embodiment that uses remote control 101 as an access device, the keys remote control 101 have the following functions:

| SET UP INTERNET ACCESS menu screen remote control key functions | |
|---|---|
| Key | Behavior |
| MOREINFO | Displays a help screen for the currently highlighted text entry field. |
| UP | Highlights the previous text entry field (wraps to last text entry field). |
| LEFT | Destructive backspace within the highlighted text entry field. |
| RIGHT | Space character within the highlighted text entry field. |
| DOWN | Highlights the next text entry field (wraps to first text entry field). |
| REWIND | Cycles the current letter backwards (ASCII order). Holding key down auto repeats. Only legal characters for the particular field are cycled, for example for the DNS address text entry field, cycles through numbers only. |
| STOP | Leaves the current screen without saving any changes, returns to INITIAL menu screen. |
| FORWARD, FAST-FORWARD | Cycles the current letter forward, or forward quickly (ASCII order). Holding key down auto repeats. Only legal characters for the particular field are cycled, for example, for the DNS address text entry field, cycles through numbers only. |
| CLEAR | Removes the contents of the highlighted text entry field. |
| 0, 1, 2, 3, 4, 5, 6, 7, 8, 9 | Enters number in the highlighted text entry field. |
| ENTER | Saves changes and returns to the INITIAL menu screen. |

The SETUP INTERNET ACCESS menu screen allows the user to enter network and communications parameters for the system.

SIMPLE INTERNET SETUP Screen

In certain embodiments the system may be pre-configured with stored default values for many of the required communications parameters. In such embodiments, a SIMPLE INTERNET SETUP screen is displayed when the "Setup Internet Access" menu selection from the SETUP screen is activated.

Figure 15:
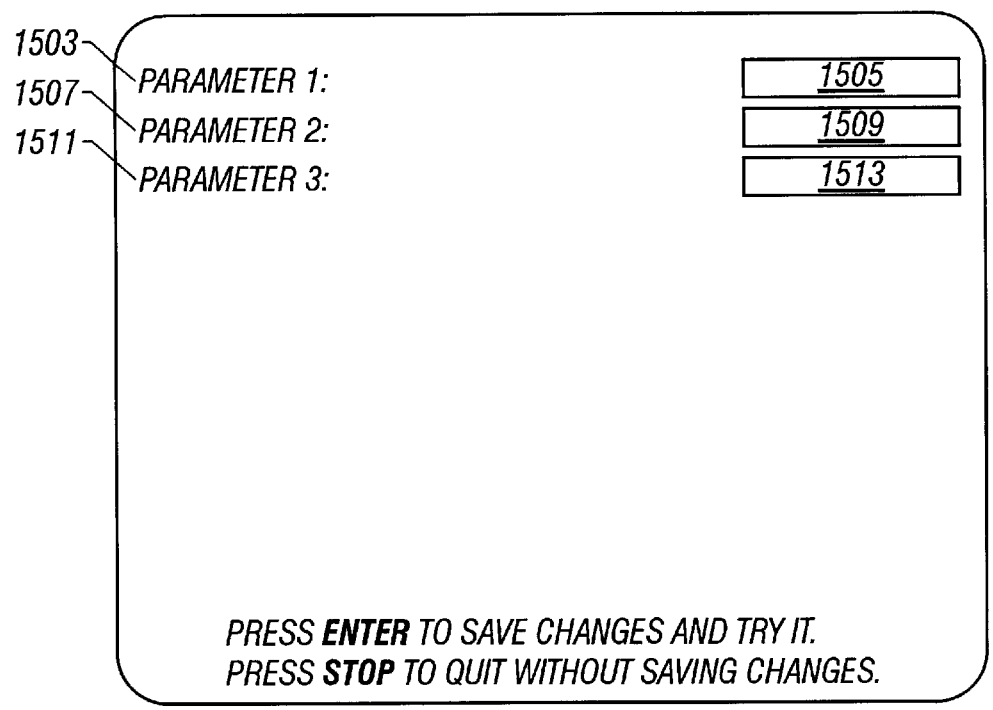
FIG. 15 illustrates a SIMPLE INTERNET SET UP screen of an embodiment of the invention.

In one embodiment, the SIMPLE INTERNET SETUP screen contains text entry fields only for the parameters for which default values have not already been specified. FIG. 15 shows a SIMPLE INTERNET SETUP menu screen 1501 of one embodiment of the invention. In the embodiment of FIG. 15, default values have been specified for all but three of the required parameters. Menu screen 1501 thus contains three text entry fields 1505, 1509, and 1513 for entering values for the three parameters 1503, 1507, and 1511, respectively.

When the SIMPLE INTERNET SETUP menu screen is displayed in an embodiment using remote control 101 as an input device, the keys on remote control 101 have the following functions:

| Key | Behavior |
| --- | --- |
| MOREINFO | Displays a help screen for the currently highlighted text entry field. |
| UP | Highlights the previous text entry field (wraps to last text entry field). |
| LEFT | Destructive backspace within the highlighted text entry field. |
| RIGHT | Space character within the highlighted text entry field. |
| DOWN | Highlights the next text entry field (wraps to first text entry field). |
| REWIND | Cycles the current letter backwards (ASCII order). Holding key down auto repeats. Only legal characters for the particular field are cycled, for example for the DNS address text entry field, cycles through numbers only. |
| STOP | Leaves the current screen without saving any changes, returns to INITIAL menu screen. |
| FORWARD, FAST-FORWARD | Cycles the current letter forward, or forward quickly (ASCII order). Holding key down auto repeats. Only legal characters for the particular field are cycled, for example, for the DNS address text entry field, cycles through numbers only. |
| CLEAR | Removes the contents of the highlighted text entry field. |
| 0, 1, 2, 3, 4, 5, 6. 7, 8, 9 | Enters number in the highlighted text entry field. |
| ENTER | Saves changes and returns to the INITIAL menu screen. |

The SIMPLE INTERNET SETUP menu screen allows the user to enter network and communications parameters for the system for which default values have not already been specified.

SET UP SELF IMAGE Menu Screen

Figure 16:
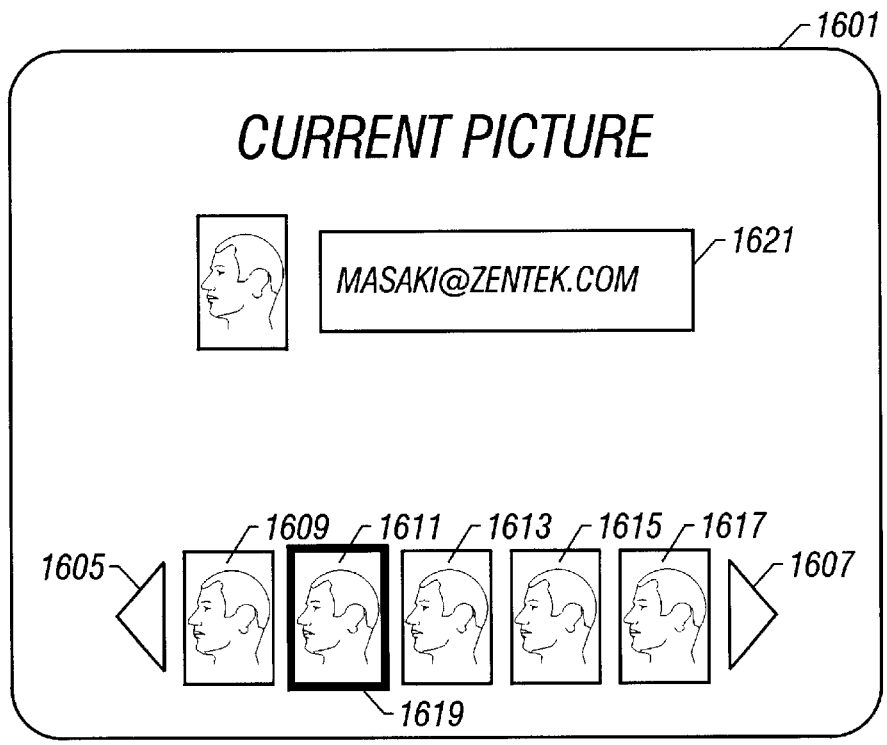
FIG. 16 illustrates a SET UP SELF IMAGE screen of an embodiment of the invention.

Activating the "Set Up Self Image" menu selection from the SETUP menu screen in one embodiment of the invention causes a SET UP SELF IMAGE screen to be displayed. The SET UP SELF IMAGE menu screen 1601 of one embodiment of the invention is shown in FIG. 16. In one embodiment, menu screen 1601 has two user input entry modes. The first mode is a text entry mode for entering text information, such as the user's e-mail address, to be associated with a selected thumbnail. The second mode is a thumbnail selection mode used for selecting a thumbnail to be associated with the user in the user's e-mail messages. In one embodiment, the user can switch between modes by using UP and DOWN directional keys 105 on the remote control 101. Activating the UP key activates Mode 1 (the text entry mode), and activating the DOWN key activates Mode 2 (the thumbnail selection mode).

In the embodiment of FIG. 16, a row of thumbnail pictures 1609, 1611, 1613, 1615, and 1617 (which may have been input, for example, from a digital camera) is displayed along the bottom portion of SET UP SELF IMAGE screen 1601. In FIG. 16, thumbnail 1611 is the currently selected thumbnail, as indicated by highlighting 1619. Currently selected thumbnail 1611 is also displayed in the upper portion of menu screen 1601 next to text entry field 1621. In one embodiment, the currently selected thumbnail can be changed by moving highlighting 1619 with an appropriate user input device, for example by using LEFT and RIGHT directional keys 105 on remote control 101.

To assist the user in the thumbnail selection process in one embodiment of the invention, left and right scroll prompts 1605 and 1607 may be displayed. If more thumbnails can be displayed by scrolling to the left, left scroll prompt 1605 is displayed on screen 1601. If more thumbnails can be displayed by scrolling to the right, right scroll prompt 1607 is displayed on screen 1601.

To identify the user's e-mail messages to recipients, the user must enter the user's e-mail address in text entry field 1621. To do so, the user must be in the text entry mode (Mode 1). Once the user has selected the desired thumbnail and entered the user's e-mail address to be used as identifying information on the user's e-mail messages, the user may save this information by issuing an "enter" command, for example by pressing ENTER key 119 of remote control 101.

When the SET UP SELF IMAGE screen is being used to enter a mail address into the text entry field 1621 in an embodiment of the invention that uses remote control 101 as an input device, the keys on remote control 101 provide the following functions:

| SET UP SELF IMAGE menu screen remote control key functions in MODE 1 | |
| --- | --- |
| Key | Behavior |
| MOREINFO | Displays a help screen. |
| UP, DOWN | Moves the highlighting between the text entry field and the row of thumbnails (switches between modes 1 and 2). |
| LEFT | Destructive backspace within the text entry field. |
| RIGHT | Space character within the text entry field. |
| REWIND | Cycles the current letter backwards (ASCII order). Holding key down auto repeats. Only legal characters are shown. |
| STOP | Returns to the INITIAL menu screen without saving any changes. |
| FORWARD, FAST-FORWARD | Cycles the current letter forward, or forward quickly (ASCII order). Holding key down auto repeats. Only legal characters are cycled. Legal characters are letters, numbers, "+", "−", and "@". |

| SET UP SELF IMAGE menu screen remote control key functions in MODE 1 | |
| --- | --- |
| Key | Behavior |
| CLEAR | Removes the contents of the text entry field. |
| 0, 1, 2, 3, 4, 5, 6. 7, 8, 9 | Enters number in the text entry field. |
| ENTER | Saves entry and returns to SETUP menu screen. |

When the SET UP SELF IMAGE screen is being used to select thumbnails in an embodiment of the invention that uses remote control 101 as an input device, the keys on the remote control 101 have the following functions:

| SET UP SELF IMAGE menu screen remote control key functions in MODE 2 | |
| --- | --- |
| Key | Behavior |
| MOREINFO | Displays a help screen. |
| LEFT | Moves highlighting back one thumbnail, auto scrolling if necessary. |
| RIGHT | Moves highlighting forward one thumbnail, auto scrolling if necessary. |
| UP, DOWN | Moves the highlighting between the text entry field and the row of thumbnails (switches between modes 1 and 2). |
| STOP | Returns to the INITIAL menu screen without saving any changes. |
| ENTER | Replaces the current thumbnail with the highlighted thumbnail, and returns to the SETUP menu screen. |
| All other keys | No action. |

The SET UP SELF IMAGE menu screen allows a user to select a thumbnail and e-mail address to be used to identify the user to the user's e-mail recipients.

SET UP RECIPIENT PICTURES AND E-MAIL ADDRESSES Menu Screen

Activating the "Set Up Recipient Pictures and E-Mail Addresses" menu selection from the SETUP menu screen in one embodiment of the invention causes a SET UP RECIPIENT PICTURES AND E-MAIL ADDRESSES menu screen to be displayed. This screen provides functions that allow the user to create a visual address book for use with the audio visual e-mail system.

Figure 17:
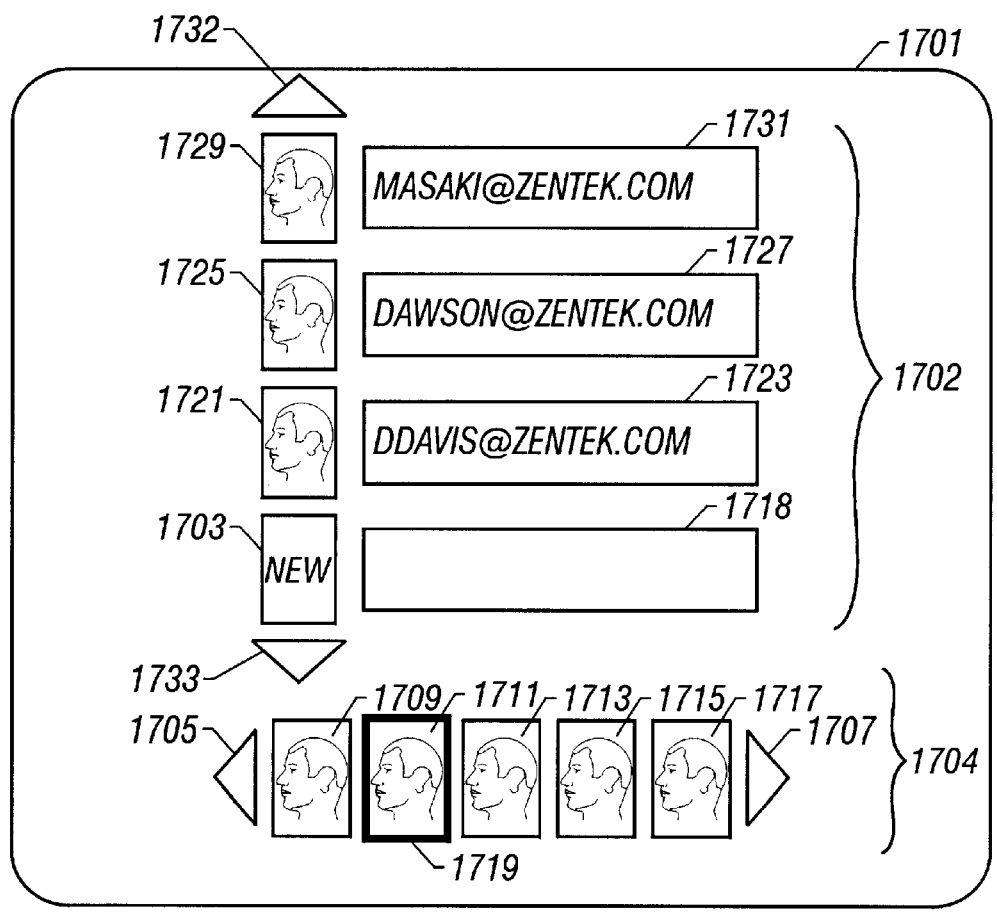
FIG. 17 illustrates a SET UP RECIPIENT PICTURES AND E-MAIL ADDRESSES screen of an embodiment of the invention.

The SET UP RECIPIENT PICTURES AND E-MAIL ADDRESSES screen 1701 of one embodiment of the invention is shown in FIG. 17. As shown in FIG. 17, screen 1701 is divided into two portions, an upper portion 1702 and a lower portion 1704. Upper portion 1702 displays a column of recipient text entry fields for e-mail addresses and associated thumbnail pictures. In FIG. 17 thumbnail 1729 is associated with the e-mail address in text entry field 1731. Thumbnail 1729 together with the e-mail address in text entry field 1731 form a thumbnail/address combination. Thumbnail 1725 is associated with the e-mail address in text entry field 1727, forming a second thumbnail/address combination. Thumbnail 1721 is associated with the address in text entry field 1723, forming a third thumbnail/address combination. Thumbnail space in 1703 is blank, as is the associated text entry field 1718. The next address that is added to the address book will be inserted into the text entry field 1718, and it will be associated with the thumbnail that will be inserted into thumbnail space 1703. If there are more recipient thumbnail and address combinations than can be displayed on the screen at one time, a scrolling mechanism may be used. In the embodiment of FIG. 17, up scrolling arrow 1732 is displayed above topmost thumbnail 1729 if more thumbnail/address combinations can be displayed by scrolling upwards. Down scrolling arrow 1733 is displayed below lowermost thumbnail 1703 if more thumbnail/address combinations can be displayed by scrolling downwards.

In FIG. 17, The bottom portion 1704 of screen 1701 contains a row of thumbnail pictures 1709, 1711, 1713, 1715, and 1717 of possible new entries into the address book. Thumbnail 1711 is the currently selected thumbnail, as indicated by highlighting 1719. In one embodiment, the currently selected thumbnail can be changed by moving highlighting 1719 to the right and the left through appropriate user input commands, for example by the use of LEFT and RIGHT directional keys 105 on remote control 101.

To assist the user in the thumbnail selection process in one embodiment of the invention left and right scroll prompts 1705 and 1707 may be displayed. If more thumbnails can be displayed by scrolling to the left, left scroll prompt 1705 is displayed on screen 1701. If more thumbnails can be displayed by scrolling to the right, right scroll prompt 1707 is displayed on screen 1701. When the desired thumbnail for an additional recipient has been highlighted, the thumbnail can be selected for a new entry in the address book by issuing an "enter" command, for example by using ENTER key 119 of remote control 101.

Because the screen has two different areas which are subject to user input the screen has two user input entry modes, mode 1 and mode 2. Mode 1 is the entry mode for entering input into the text entry fields in the upper portion 1702 of screen 1701. Mode 2 is the entry mode for selecting a thumbnail from the lower portion 1704 of screen 1701. Upon activation, screen 1701 is initially in mode 1, and thumbnail space 1703 labeled "NEW" together with corresponding text entry area 1718 are highlighted. At any time, either one of the address/thumbnail combinations in upper portion 1702 (mode 1) or one of the thumbnail images in lower portion 1704 (mode 2) of screen 1701 are highlighted.

In mode 1 addresses are inserted into a text entry field, e.g. 1718. In mode 2 a new thumbnail, e.g. 1711, is selected.

| SET UP RECIPIENT PICTURES AND E-MAIL ADDRESSES menu screen remote control key functions in MODE 1 | |
| --- | --- |
| Key | Behavior |
| MOREINFO | Displays a help screen. |
| UP, DOWN | Moves the highlighting between the text entry fields and the row of thumbnails (switches between modes 1 and 2). |
| LEFT | Destructive backspace within the text entry field. |
| RIGHT | Space character within the text entry field. |
| REWIND | Cycles the current letter backwards (ASCII order). Holding key down auto repeats. Only legal characters are shown. |
| STOP | Returns to the INITIAL menu screen without saving any changes. |
| FORWARD, FAST-FORWARD | Cycles the current letter forward, or forward quickly (ASCII order). Holding key down auto repeats. Only legal characters are cycled. Legal |

SET UP RECIPIENT PICTURES AND E-MAIL ADDRESSES menu screen remote control key functions in MODE 1 -continued

| Key | Behavior |
| --- | --- |
|  | characters are letters, numbers, "+", "–", and "@". |
| CLEAR | Removes the contents of the text entry field. |
| 0, 1, 2, 3, 4, 5, 6. 7, 8, 9 | Enters number in the text entry field. |
| ENTER | Saves entry and returns to SETUP menu screen. |

SET UP RECIPIENT PICTURES AND E-MAIL ADDRESSES menu screen remote control key functions in MODE 2

| Key | Behavior |
| --- | --- |
| MOREINFO | Displays a help screen. |
| LEFT | Moves highlighting back one thumbnail, auto scrolling if necessary. |
| RIGHT | Moves highlighting forward one thumbnail, auto scrolling if necessary. |
| UP, DOWN | Changes the highlighting between the text entry fields and the row of thumbnails (switches between modes 1 and 2). |
| STOP | Returns to the INITIAL menu screen without saving any changes. |
| ENTER | Replaces the current thumbnail with the highlighted thumbnail, and returns to the SETUP menu screen. |
| All other keys | No action. |

The SET UP RECIPIENT PICTURES AND E-MAIL ADDRESSES screen provides functions that allow the user to create or modify the entries in the user's visual address book. The user inputs thumbnail pictures into the system from an external source, for example a digital camera, and chooses from among the available thumbnails, for example using remote control 101. The chosen thumbnail is used to create a new visual e-mail address for a recipient. Alternatively, the chosen thumbnail can be used to replace the thumbnail of an existing address/thumbnail combination. The user then inputs a text e-mail address of the recipient into the text entry field associated with the selected thumbnail, for example using an input device such as remote control 101. In this way visual addresses may be added to the user's visual address book and existing visual addresses may be changed.

The audio visual e-mail system of the invention thus allows a user to associate e-mail addresses of recipients with thumbnail pictures.

Sources of Pictures

In one embodiment of the invention, a digital still camera attached to and controlled by the audio visual e-mail system controller is used as a source of pictures that are used in the audio visual e-mail system of the invention. Pictures are also present on the audio visual e-mail received from other audio visual e-mail systems. In one embodiment the pictures are 128×128 pixels in size, while thumbnails of the pictures are 64×64 pixels in size.

Block Diagram of Audio Visual-mail System

Figure 18:
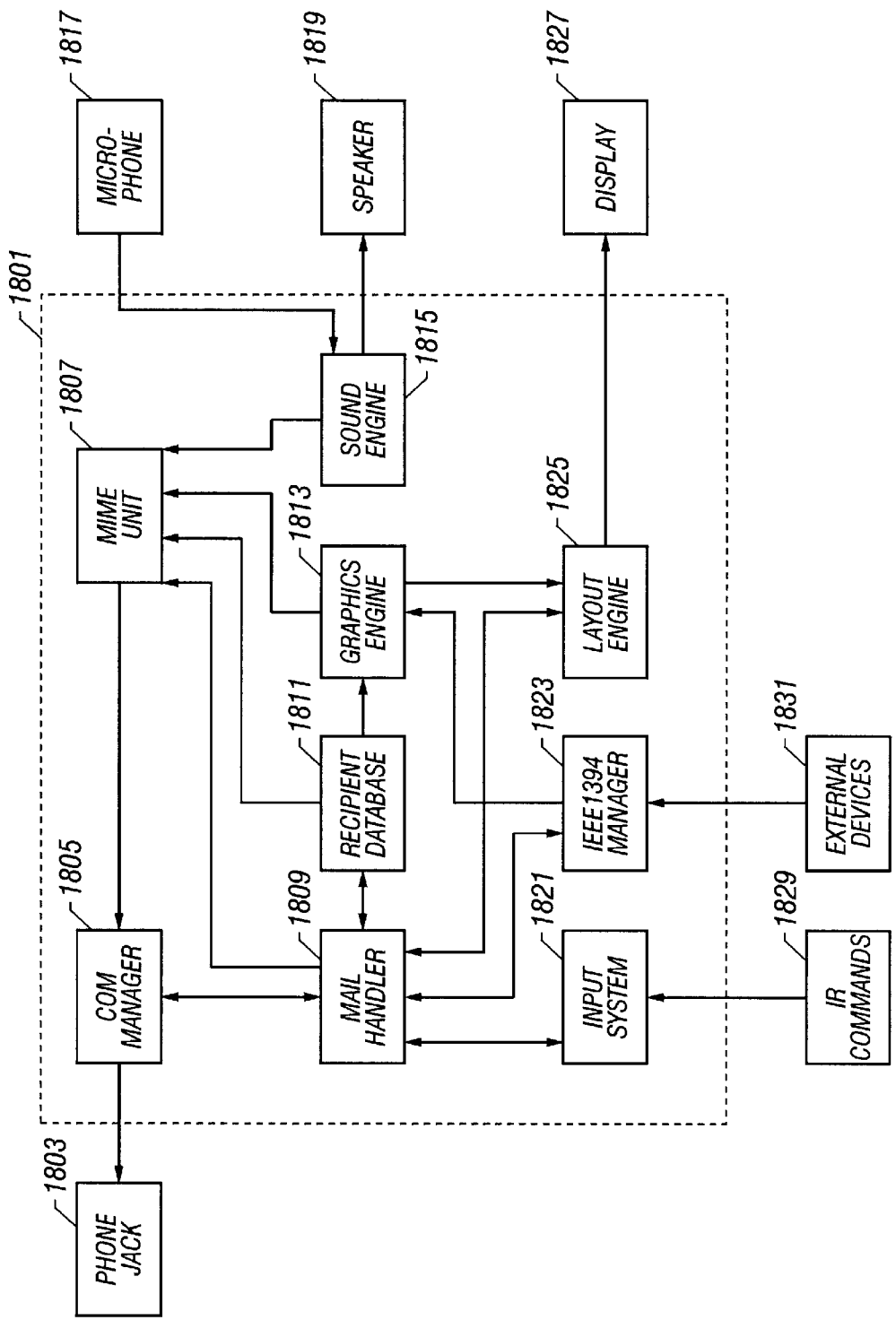
FIG. 18 is a block diagram of an embodiment of the invention.

FIG. 18 shows a block diagram of one embodiment of an audio visual e-mail system of the invention. In the embodiment of FIG. 18, audio visual e-mail system 1801 consists of a number of separate functional blocks, which are identified in the following table:

| Functional Block | FIG. 18 Reference Number |
| --- | --- |
| AUDIO VISUAL E-MAIL SYSTEM | 1801 |
| PHONE JACK CONNECTION | 1803 |
| COMMUNICATIONS MANAGER | 1805 |
| MAIL HANDLER | 1807 |
| MIME UNIT | 1809 |
| RECIPIENT DATABASE | 1811 |
| GRAPHICS ENGINE | 1813 |
| SOUND ENGINE | 1815 |
| MICROPHONE | 1817 |
| SPEAKER | 1819 |
| INPUT SYSTEM | 1821 |
| IEEE 1394 MANAGER | 1823 |
| LAYOUT ENGINE | 1825 |
| DISPLAY | 1827 |
| IR COMMANDS | 1829 |
| EXTERNAL DEVICES | 1831 |

The interconnection diagram of the functional blocks of the AUDIO VISUAL E-Mail system is shown in FIG. 18. It graphically shows the functional blocks of the system and the interconnections between them.

The blocks shown in FIG. 18 are functional blocks and may consist of hardware, software, or a combination of both.

Referring to FIG. 18, PHONE JACK CONNECTION 1803 is used to connect audio visual e-mail system 1801 to a telecommunications network, such as the internet. PHONE JACK CONNECTION 1803 may, for example, provide a connection to a telephone network, an ethernet network, a cable system, or some other telecommunications network. PHONE JACK CONNECTION 1803 is connected to audio visual e-mail system 1801 via COMMUNICATIONS MANAGER 1805.

The COMMUNICATIONS MANAGER 1805 provides a communications interface between audio visual e-mail system 1801 and the telecommunications network connection provided by PHONE JACK CONNECTION 1803. In one embodiment, COMMUNICATIONS MANAGER 1805 includes a modem and modem control software. Alternatively, COMMUNICATIONS MANAGER 1805 may include other interfaces, such as, for example, a cable modem or an ethernet interface. In one embodiment COMMUNICATIONS MANAGER 1805 is connected via PHONE JACK CONNECTION 1803 to a telephone line and handles tasks such as dialing a connection to an internet access service provider and handling incoming and outgoing communications protocols. COMMUNICATIONS MANAGER 1805 also separates incoming messages from communications protocols and passes the incoming messages on to MAIL HANDLER 1809. COMMUNICATIONS MANAGER 1805 also packages outgoing transmissions of audio visual e-mail messages that it receives from MAIL HANDLER 1809 and MIME UNIT 1807 with appropriate communications protocols for transmission to the intended recipients over the communications network.

MAIL HANDLER 1809 is the main system controller for AUDIO VISUAL E-MAIL SYSTEM 1801. As shown in FIG. 18, MAIL HANDLER 1809 communicates with COMMUNICATIONS MANAGER 1805, MIME UNIT 1807, RECIPIENT DATABASE 1811, INPUT SYSTEM 1821, IEEE1394 MANAGER 1823, and LAYOUT ENGINE 1825.

MAIL HANDLER 1809 controls COMMUNICATIONS MANAGER 1805, telling it when to connect to the telecommunications network and send e-mail messages to and/ or retrieve e-mail messages from the network. MAIL HANDLER 1809 provides COMMUNICATIONS MANAGER 1805 with communications parameters needed to connect to the network, including the dial up parameters for the network and network log on parameters.

MAIL HANDLER 1809, also receives user input commands from INPUT SYSTEM 1821. These commands are issued by a user to control the operation of the AUDIO VISUAL E-MAIL SYSTEM 1801. In one embodiment, INPUT SYSTEM 1821 receives, accepts, demodulates, and reconstructs infrared commands received from IR COMMANDS block 1829. IR COMMANDS block 1829 includes a remote control or other IR input device (e.g. an IR keyboard) that may be used by the user to transmit commands to Audio Visual E-Mail System 1801. After decoding the commands received from IR COMMANDS block 1829, INPUT SYSTEM 1821 sends the decoded commands to the MAIL HANDLER 1809.

MAIL HANDLER 1809 also communicates with LAYOUT ENGINE 1825, telling it which menu screens, thumbnails, and visual messages to generate for display on DISPLAY 1827. LAYOUT ENGINE 1825 controls the generation of the on-screen displays of audio visual e-mail system 1801. It handles the visual display of messages, the highlighting of thumbnails, display of menu screens, and control buttons. It receives graphics input from GRAPHICS ENGINE 1813, and is controlled by MAIL HANDLER 1809.

MAIL HANDLER 1809 also interacts with RECIPIENT DATABASE 1811 controlling the handling of e-mail addresses and recipient thumbnails. RECIPIENT DATABASE 1811 contains the audio visual e-mail system's 1801 address book. The address book contains recipients' e-mail addresses and identification thumbnails. RECIPIENT DATABASE 1811 is controlled by MAIL HANDLER 1809 and provides e-mail recipients' e-mail addresses and thumbnails to GRAPHICS ENGINE 1813 for display.

MAIL HANDLER 1809 also interacts with the MIME UNIT 1807 to control the encoding and decoding of graphics and sound of audio visual e-mail messages. MIME UNIT 1807 assembles outgoing audio visual e-mail messages for transmission and disassembles (parses) incoming audio visual e-mail messages for display. Audio visual e-mail messages may include identification thumbnails, visual portions of messages, sound portions of messages, text portions of messages, and the sender's and recipients' e-mail addresses. MIME UNIT 1807 is controlled by MAIL HANDLER 1809. MIME UNIT 1807 receives thumbnails from RECIPIENT DATABASE 1811,. It receives graphic images from and provides graphic images to GRAPHICS ENGINE 1813. It receives sound files from and provides sound files to SOUND ENGINE 1815.

GRAPHICS ENGINE 1813 converts and formats thumbnails and graphics included in messages for display on DISPLAY 1827. GRAPHICS ENGINE 1813 also formats externally generated graphics received from IEEE 1394 MANAGER 1823 for display and for printing. GRAPHICS ENGINE, 1813 provides suitably formatted graphic files to MIME UNIT 1807 inclusion in audio visual e-mail messages.

SOUND ENGINE 1815, inputs sound from an external MICROPHONE 1817, and creates sound files suitable for including in audio visual e-mail messages. SOUND ENGINE 1815 also inputs sound files and plays them back through SPEAKER, 1819. In one embodiment, SOUND ENGINE 1815 provides message playing functions play, forward, reverse, and stop. MICROPHONE 1817 is used for inputting audio into SOUND ENGINE 1815. SPEAKER 1819 is used for playing back audio files, including the audio potions of audio visual e-mail messages, delivered to it from SOUND ENGINE 1813. MAIL HANDLER 1809 also interacts with the IEEE 1394 Manager 1823 to control the input of graphics from EXTERNAL DEVICES 1831, which may include devices such as still cameras, printers, storage devices and other peripherals. MAIL HANDLER 1809 also interacts with IEEE 1394 MANAGER 1823, to control the transmission of e-mail messages to a printer for printing. IEEE 1394 MANAGER 1823 is controlled by MAIL HANDLER 1809. IEEE 1394 MANAGER 1823 handles communications with EXTERNAL DEVICES 1831 with respect to the input, output, and storage of audio visual e-mail messages. IEEE 1394 MANAGER 1823 handles input from a digital camera for the purpose of creating thumbnails and visual portions of messages.

DISPLAY 1827 is the display screen on which user output is displayed. DISPLAY 1827 is used to display messages and menu screens. DISPLAY 1827 receives its display information from LAYOUT ENGINE 1825. In one embodiment, DISPLAY 1827 comprises a television-screen. In other embodiments, DISPLAY 1827 comprises a computer monitor, an LCD screen of a handheld computer, cellular telephone, or other electronic appliance. DISPLAY 1827 may be monochrome or color, and have any of a variety of sizes and shapes.

FIG. 18 thus shows the layout of functional components of one embodiment of the audio visual e-mail system of the invention. It shows the connections between each functional section and shows of how the functional components combine to form an implementation of the audio visual e-mail system.

E-mail systems have proliferated in recent years, and while their functionality has increased so has their complexity. The audio visual e-mail system of the invention reduces the complexity of sending and receiving audio visual e-mail messages to a level that allows a user to send and receive audio visual e-mail with a minimum of inconvenience. The prior art paradigm of selecting e-mail addresses from a list of long and complex e-mail addresses is replaced by selecting a thumbnail image of the intended recipient. Instead of trying to guess the identity of the sender of an e-mail message, an e-mail message created according to the invention is automatically "signed" by a thumbnail image of the sender. Instead of sending long written descriptions that are prone to misunderstanding and difficult to read, the sender of an e-mail message according to the invention can send a photo of the object to be described together with a verbal, audio description. In one embodiment, a user uses a television-type remote control as a command interface to create audio visual messages containing a picture, a verbal description in the user's own words, and a thumbnail portrait of the user.

Thus, a method and apparatus for providing an audio visual e-mail system has been described. Although the present invention has been described with respect to certain example embodiments, it will be apparent to those skilled in the art that the present invention is not limited to these specific embodiments. Although the operation of certain embodiments has been described in detail using certain detailed process steps, some of the steps may be omitted or other similar steps may be substituted without departing from the scope of the invention. Further, although the invention has been described with respect to certain hardware and software components, other or different hardware and software components may be used. Other embodiments incorporating the inventive features of the present invention will be apparent to those skilled in the art. The invention is defined by the claims and their full scope of equivalents.

What is claimed is:

1. A method of performing e-mail messaging comprising:
coupling an audio recording device to a television set and a telephone line connection;
recording an audio message using said audio recording device;
selecting a self image using a set up self image menu wherein said selecting comprises:
coupling a visual recording device to said television set and said telephone line connection;
recording at least one self image using said visual recording device;
displaying at least one visual icon, wherein each visual icon is associated with one of said self images, and wherein one of said visual icons comprises an active icon;
displaying the self image associated with said active icon;
choosing one of said self images to be said selected self image;
displaying a plurality of images of potential e-mail message recipients other than said self;
selecting at least one of said images of potential recipients;
automatically associating said selected at least one of said images of potential recipients and said selected self image with an e-mail message to be delivered, wherein said e-mail message to be delivered comprises said audio message;
transmitting said e-mail message to be delivered and said automatically associated self image to an e-mail address associated with said at least one image of said potential recipient;
upon receipt of said e-mail message by a recipient, automatically displaying said transmitted self image as a signature for said received audio message.

2. The method of claim 1, further comprising:
recording a visual message using said visual recording device;
wherein said e-mail message comprises said audio message and said visual message.

3. A method of performing e-mail messaging comprising:
coupling a recording device to a telephone line connection;
recording a message using said recording device;
selecting a self image using a set up self image menu wherein said selecting comprises;
displaying at least one visual icon, wherein each visual icon is associated with one of said self images, and wherein one of said visual icons comprises an active icon;
displaying the self image associated with said active icon;
choosing one of said self images to be said selected self image;
displaying a plurality of visual depictions of potential message e-mail recipients other than a sender;
selecting at least one of said visual depictions of potential recipients;
automatically associating said selected at least one of said visual depictions of potential recipients and said selected self image with an e-mail message to be delivered, wherein said e-mail message comprises said recorded message;
transmitting said e-mail message to be delivered and said automatically associated self image to an e-mail address associated with said at least one visual depiction of said potential recipient;
upon receipt of said e-mail message by a recipient, automatically displaying said self image as a signature for said received recorded message.

4. The method of claim 3, further comprising:
said e-mail message recipient other than a sender creating a database of said e-mail senders by performing the steps of:
obtaining said e-mail message wherein said email message comprises an e-mail address of said sender and said self image signature;
receiving a command from said recipient selecting at least one of said self image signatures of said received e-mails;
storing said self image signature in a database;
storing said e-mail address of selected sender in said database;
storing an association between said address and said self image signature in said database.

5. The method of claim 4, further comprising: associating said plurality of visual depictions of potential e-mail recipients other than a sender, said self image signature, said e-mail addresses of said senders, and said associations between said addresses and said self image signature in said database.

6. The method of claim 3 wherein said self image signature is included in a header of said e-mail message.

7. The method of claim 3 wherein said recorded message comprises an audio message.

8. The method of claim 7 wherein said recorded message comprises a visual message.

9. The method of claim 3 wherein said recorded message comprises a visual message.

10. An apparatus for performing messaging comprising:
an audio recording device coupled to a television set and a telephone line connection;
a recorded audio message, recorded using said audio recording device;
a set up self image menu for selecting a self image comprising;
at least one visual icon associated with at least one self image, wherein one of said visual icons comprises an active icon;
a display of said self image associated with said active icon;
a self image selector for choosing one of said self images;
a plurality of images of potential message e-mail recipients other than said self;
a recipients selection device for selecting at least one of said images of potential recipients device for selecting at least one of said images of potential recipients;
an association engine for automatically associating said selected at least one of said images of potential recipients and said selected self image with an e-mail message to be delivered, wherein said e-mail message comprises said recorded audio message;
a transmitter for transmitting said e-mail message to be delivered and said automatically associated self image to an e-mail address associated with said at least one image of said potential recipient;

a signature display for automatically displaying said self image to a recipient as a signature for a received email upon receipt of said e-mail message.

11. A method for transmitting audio visual email comprising:

generating a first user-interface via a first controller coupled to a first display screen, said first controller having a first audio input/output interface;

presenting a first user-interface to a sending user via said first display screen, wherein said user-interface comprises a plurality of icons each representative of receiving users;

obtaining audio data from said sending user via said audio input/output interface;

obtaining a selection from said sending user of at least one receiving user from said plurality of icons wherein said selection enables said sending user to identify said at least one receiving users without requiring said sending user to have knowledge of an electronic mail address associated with said at least one receiving user;

sending message data comprising said audio data, text data, and an image representative of said sending user to said at least one receiving user via a data communication network coupled to said first controller;

receiving said message data at a second controller coupled to said data communication network wherein said second controller comprises a second audio input/output interface and a second display screen associated with said at least one receiving user;

displaying a second user-interface to said at least one receiving user via said second display screen wherein said second user-interface comprises said image representative of said sending user;

presenting said audio data portion of said message data to said at least one receiving user via said second audio input/output interface and said text data to said at least one receiving user when said at least one receiving user selects said image representative of said sending user, wherein said audio data and said text data are presented automatically without requiring said receiving user to identify an external application configured to play said audio data or display said text data.

* * * * *